US008299190B2

(12) United States Patent
Sako et al.

(10) Patent No.: US 8,299,190 B2
(45) Date of Patent: Oct. 30, 2012

(54) COLORED POLYMER PARTICLES, METHOD FOR PRODUCING THE SAME, AND TONER AND DEVELOPER USING THE SAME

(75) Inventors: Takeshi Sako, Hamamatsu (JP); Idzumi Okajima, Hamamatsu (JP); Takahiro Yamashita, Hadano (JP); Satoyuki Sekiguchi, Hamamatsu (JP); Chiaki Tanaka, Izunokuni (JP); Shogo Suzuki, Yokohama (JP); Ryota Inoue, Mishima (JP)

(73) Assignees: National University Corporation Shizuoka University, Shizuoka-shi (JP); Ricoh Company, Ltd., Tokyo (JP)

( * ) Notice: Subject to any disclaimer, the term of this patent is extended or adjusted under 35 U.S.C. 154(b) by 865 days.

(21) Appl. No.: 12/338,519

(22) Filed: Dec. 18, 2008

(65) Prior Publication Data

US 2009/0162770 A1 Jun. 25, 2009

(30) Foreign Application Priority Data

Dec. 19, 2007 (JP) ................................ 2007-327059
Dec. 19, 2007 (JP) ................................ 2007-327083

(51) Int. Cl.
*C08F 2/04* (2006.01)
*G03G 9/08* (2006.01)

(52) U.S. Cl. .............. 526/214; 430/137.15; 430/137.17; 526/194

(58) Field of Classification Search ............. 430/137.15, 430/137.17; 526/194, 214
See application file for complete search history.

(56) References Cited

U.S. PATENT DOCUMENTS

| | | | | |
|---|---|---|---|---|
| 4,097,404 | A * | 6/1978 | Brown | 430/137.11 |
| 5,780,565 | A * | 7/1998 | Clough et al. | 526/206 |
| 6,024,801 | A * | 2/2000 | Wallace et al. | 134/1 |
| 7,171,151 | B2 * | 1/2007 | Endo et al. | 399/349 |
| 7,390,607 | B2 * | 6/2008 | Tanaka et al. | 430/137.15 |
| 7,396,625 | B2 | 7/2008 | Tanaka et al. | |
| 2007/0020548 | A1 * | 1/2007 | Tanaka et al. | 430/109.1 |
| 2007/0059628 | A1 * | 3/2007 | Tanaka et al. | 430/110.4 |
| 2007/0202427 | A1 | 8/2007 | Tanaka | |
| 2008/0280224 | A1 | 11/2008 | Inoue et al. | |

FOREIGN PATENT DOCUMENTS

| | | |
|---|---|---|
| JP | 2006-30981 | 2/2006 |
| JP | 2007-47752 | 2/2007 |
| JP | 2007-108694 | 4/2007 |
| JP | 2007-108731 | 4/2007 |
| JP | 2008-70834 | 3/2008 |

* cited by examiner

*Primary Examiner* — Janis L Dote

(74) *Attorney, Agent, or Firm* — Oblon, Spivak, McClelland, Maier & Neustadt, L.L.P.

(57) ABSTRACT

A method for producing colored polymer particles, including adding a colorant-containing composition containing a radically polymerizable monomer and a colorant in a supercritical fluid or a subcritical fluid and polymerizing the radically polymerizable monomer, so as to produce colored polymer particles which are insoluble in the supercritical fluid or subcritical fluid, wherein the supercritical fluid or subcritical fluid is a supercritical fluid or subcritical fluid in which at least the radically polymerizable monomer is soluble, but polymer particles resulted from polymerization of the radically polymerizable monomer are insoluble, and wherein the colorant is at least one selected from the group consisting of a pigment, a dye and a polymer dye.

6 Claims, 6 Drawing Sheets

COLORED POLYMER PARTICLES, METHOD FOR PRODUCING THE SAME, AND TONER AND DEVELOPER USING THE SAME

BACKGROUND OF THE INVENTION

1. Field of the Invention

The present invention relates to colored polymer particles suitably used as a toner for electrophotography, electrostatic recording, electrostatic printing and the like, and to a method for effectively producing the colored polymer particles, and a toner and a developer using the colored polymer particles.

2. Description of the Related Art

As electrophotography many methods are known (see U.S. Pat. No. 2,297,691 and Japanese Patent Application Publication (JP-B) No. 42-23910). Generally, the method includes a electrostatic image forming step of electrically forming a latent image on a photoconductive layer containing a photoconductive material by various units, a developing step of developing the latent electrostatic image using a toner so as to form a toner image, a transferring step of transferring the toner image to a recording medium such as paper, a fixing step of fixing the transferred toner image onto the recording medium by heat, pressure, hot-press or solvent steam, a cleaning step of removing the residual toner on the photoconductor layer.

It is required that toners for electrophotography be produced by more energy-saving and environment-friendly methods. Conventionally, a melt-kneading and pulverization method has been known in current toner production methods. In recent years, chemical methods in a liquid solvent (for example, polymerization methods such as emulsion polymerization method, suspension polymerization method, dispersion polymerization method, dissolution and suspension method, and dissolution, suspension and extension method) have been used in most cases for production of toners. In view of recent environmental problems, as chemical toners produced through these chemical methods (polymerization methods), chemical toners termed as “capsule toner”, “core shell toner”, etc. are available that are provided in a form that makes efficient provision of desired functions possible.

In such toner production methods that use the melt-kneading and pulverization method, how uniformly each constituent material is dispersed and pulverized is important to ensure that the resultant toner particles have uniform shapes. In general, pulverized toner particles have irregular shapes with randomly-sized cross sections, and control of the shape or structure of toner particles become very difficult. Moreover, when coloring materials, releasing agents, charge controlling agents and the like are added to the toner, these additives tend to migrate to the surfaces of toner particles during a pulverization process because they cleavage along their crystal plane, causing problems that quality such as toner properties (e.g., flowability and charge ability) may be easily decreased, for example, variations may occur in the charge ability among individual toner particles.

Moreover, materials for toner are also limited in selection. That is, a resin colorant dispersion should be brittle enough to be pulverized. However, in case where the brittle resin colorant dispersion is used, particles having a wide range of a particle size are easily formed when the dispersion is pulverized at high speed. Particularly, a new problem occurs that a relatively large proportion of excessively pulverized particles is contained among particles. Moreover, highly brittle materials are not preferably used, because they are further pulverized easily when used in copiers or the like.

On the other hand, to overcome the problems of toner by these pulverization method, for example, a suspension polymerization method (one of the production method of chemical toner) is proposed in Japanese Patent Application Laid-Open (JP-A) No. 36-10231. In the suspension polymerization method, a polymerizable monomer, colorant, polymerization initiator, charge controlling agent and the like are dissolved or dispersed so as to produce a monomer composition, and then the monomer composition is dispersed and polymerized simultaneously in water containing a dispersion stabilizer, thereby to obtain a toner having a desired particle diameter.

However, the toner obtained by the method has an extremely wide particle size distribution and needs a classification step, thereby decreasing in yield. Particularly, this disadvantage outstands upon obtaining a toner having a smaller particle diameter, i.e. of 3 μm to 7 μm, which is demanded in recent years.

To solve these problems, JP-A Nos. 61-273552 and 62-73276 propose a method of nonaqueous dispersion polymerization in which polymerization is performed in the presence of a pigment in a dispersion medium to which a vinyl monomer is soluble and polymerized particles thereof are insoluble.

However, the method is not at all thought out to finely disperse the pigment to be compounded in the polymerized particles, and the pigments aggregate in polymerization system or a free pigment exists other than the polymer particles. As a result, a capsulation of the pigment within the polymer particles has been extremely difficult and the method is poor in practical use. Moreover, to solve these problems, Japanese Patent (JP-B) No. 2633383 discloses that in a polymerizable monomer, a pigment dispersion paste is prepared using a pigment and a pigment dispersant, and then dispersion-polymerized to obtain colored particles. As the surface of the colored particles becomes hydrophilic by using a hydrophilic solvent, when the colored particles used in a toner, a problem occurs in rise of charge, charge at high temperature and high humidity decreases, and charge variation increases with time. Many other problems occur, for example, nonuniform coloring, poor coloring ability, presence of free pigment, and wider particle size distribution. Moreover, depending on kinds of pigments (pigment dispersants), a desired toner polarity (positive or negative) is not easily obtained, the toner charge ability is easily adversely affected, and aging characteristics and environmental property are easily changed. Thus far, it is a reality that a satisfactory toner has not been obtained.

To solve the above-mentioned problems, JP-B Nos. 3558984 and 3537913 each proposes a chemical toner having a narrow particle size distribution by the dispersion polymerization method. However, after dispersion polymerization, the polymer particles may not be satisfactorily colored, and the resultant toner is poor in charge ability, aging characteristics and environmental property. Therefore, a satisfactory toner cannot be obtained at present.

Moreover, the method for producing a chemical toner can produce a toner having smaller diameter and narrower particle size distribution than those of a toner obtained by the pulverization method. However, the method causes problems, such as a large amount of waste liquid generated in production and requirement of a filtration step and a dry step and enormous amount of dry energy, leading to high cost, and also many other problems to be solved from the standpoint of global environment load and resource saving.

Particularly, conventional chemical toners are often granulated in water or a hydrophilic solvent, so that the toner surface tends to be hydrophilic, causing a decrease in charge ability, destabilization of aging characteristics and environmental property, and further inducing serious problems, such as developing and transferring failure, toner scattering and decrease in image quality.

As a method of solving these problems, JP-A No. 2007-047752 discloses a technique which does not use an organic solvent, not generate water and waste liquid, and not need dry energy, wherein as a dispersion solvent, a supercritical fluid or subcritical fluid is used instead of conventionally used water or an organic solvent. By using the supercritical fluid or subcritical fluid as a dispersion solvent, a toner having excellent toner properties such as charge ability, environmental property and stability over time and containing no residual monomer can be produced at low cost with less environmental load without generating waste liquid and performing a dry step.

Conventionally, in dispersion polymerization, when a colorant is previously added in a monomer and then subjected to reaction, reaction interference may occur or polymer particles may not be produced. Thus, polymer particles are colored after the reaction. When the supercritical fluid or subcritical fluid is used as a dispersion solvent, a colorant is added after polymer particles are produced. In this case, the particles are not satisfactorily colored or only the particle surface is colored. As a result, a toner having low coloring ability (low image density) and a poor weather-resistant toner are easily obtained.

Therefore, in the chemical toner produced by the conventional method, a toner having excellent toner properties, such as image density, charge and changes over time, is produced at low cost without generating waste liquid and performing a dry step, and a method for producing the toner have not been provided at present.

BRIEF SUMMARY OF THE INVENTION

The present invention solves the conventional problems and achieves the following object. That is, an object of the present invention is to provide colored polymer particles granulated in a supercritical fluid or subcritical fluid with good yield, provide a method for producing the colored polymer particles having excellent basic properties such as charge ability, at low cost, with less environmental load, and also provide a toner and a developer using the colored polymer particles to obtain high image quality.

The inventors of the present invention are intensively studied the problems and achieved the following findings.

The present invention can provide a chemical toner (polymerized toner) using colored polymer particles resulted from polymerization of a polymerizable monomer in a supercritical fluid or subcritical fluid, or colored polymer particles granulated by dissolving or dispersing a toner binder resin and a pigment in the supercritical fluid or subcritical fluid, which is excellent in toner properties such as charge ability, and provide a method for producing the toner at low cost with less environmental load.

Moreover, by performing dispersion polymerization in a supercritical fluid or subcritical fluid, a pigment can be taken in polymer particles without using a pigment dispersant, which is used in JP-B No. 2633383. This can achieve material cost saving, and shortening of production process, and provide a method for producing a toner having excellent charge ability, aging characteristics and environmental property at low cost. The method according to the present invention enables to obtain uniformly colored polymer particles in high concentration, without blocking polymerization reaction.

Among supercritical fluids and subcritical fluids, supercritical carbon dioxide and subcritical carbon dioxide are incombustible and highly safe, and respectively work as a hydrophobic solvent, thus the surfaces of the colored polymer particles obtained using the supercritical carbon dioxide or subcritical carbon dioxide become also hydrophobic. The supercritical carbon dioxide and subcritical carbon dioxide evaporate at the normal temperature and pressure, so that they are easily separated and recovered from the colored polymer particles and recycled. Moreover, as the colored polymer particles are yielded in dried state, a dry step and waste liquid processing step are not necessary and a waste liquid is not generate. Therefore, all conventional problems are solved by using supercritical carbon dioxide or subcritical carbon dioxide as the supercritical fluid or subcritical fluid.

Moreover, the inventors of the present invention are intensively studied the problems and also achieved the following findings.

In a supercritical fluid or subcritical fluid, colored polymer particles can be obtained by polymerizing a polymerizable monomer composition containing a dye and a polymerizable monomer without blocking the polymerization reaction.

This can achieve material cost saving, and shortening of production process, and provide a method for producing a toner having excellent charge ability, aging characteristics and environmental property at low cost. The method according to the present invention enables to obtain uniformly colored polymer particles in high concentration, without blocking the polymerization reaction.

The means for solving the aforementioned problems are as follows:

<1> A method for producing colored polymer particles, including adding a colorant-containing composition containing a radically polymerizable monomer and a colorant in a supercritical fluid or a subcritical fluid and polymerizing the radically polymerizable monomer, so as to produce colored polymer particles which are insoluble in the supercritical fluid or subcritical fluid, wherein the supercritical fluid or subcritical fluid is a supercritical fluid or subcritical fluid in which at least the radically polymerizable monomer is soluble, but polymer particles resulted from polymerization of the radically polymerizable monomer are insoluble, and wherein the colorant is at least one selected from the group consisting of a pigment, a dye and a polymer dye.

<2> The method for producing colored polymer particles according to <1>, wherein the supercritical fluid or subcritical fluid further contains a surfactant which affects both the radically polymerizable monomer and the supercritical fluid or subcritical fluid.

<3> The method for producing colored polymer particles according to any one of <1> and <2>, wherein the supercritical fluid or subcritical fluid further contains a releasing agent, and the colored polymer particles contain the releasing agent.

<4> The method for producing colored polymer particles according to any one of <1> to <3>, wherein the colorant is the dye or the polymer dye, and the dye or the polymer dye is dissolved in the radically polymerizable monomer.

<5> The method for producing colored polymer particles according to any one of <3> to <4>, wherein the releasing agent is dispersed in the radically polymerizable monomer so as to form a dispersion liquid of the releasing agent, and the dispersion liquid of the releasing agent is added in the composition.

<6> The method for producing colored polymer particles according to any one of <1> to <5>, wherein the supercritical fluid or subcritical fluid is supercritical carbon dioxide or subcritical carbon dioxide.

<7> The method for producing colored polymer particles according to any one of <1> to <6>, wherein the polymerization is dispersion polymerization.

<8> The method for producing colored polymer particles according to any one of <2> to <7>, wherein the surfactant has a partial structure expressed by General Formula (1).

General Formula (1)

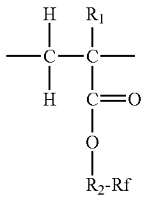

where $R_1$ represents a hydrogen atom or methyl group, $R_2$ represents a methylene group or ethylene group, and Rf represents a perfluoroalkyl group having carbon atoms of 7 to 10.

<9> Colored polymer particles produced by the method for producing colored polymer particles according to any one of <1> to <8>.

<10> A toner produced by using the colored polymer particles according to <9>.

<11> A one-component developer containing the toner according to <10>.

<12> A two-component developer containing a carrier powder and the toner according to <10>.

<13> A process cartridge containing an image bearing member, and at least one unit selected from a charging unit, a developing unit and a cleaning unit, wherein the image bearing member and the at least one unit are integrally formed, wherein the process cartridge is detachably attached to an image forming apparatus, and wherein the developing unit contains the developer according to any one of <11> and <12>.

<14> An image forming method including developing a latent electrostatic image formed on an image bearing member using the developer according to any one of <11> and <12> so as to form a toner image, transferring the toner image formed on the image bearing member to a recording medium, and fixing the transferred toner image onto the recording medium by heat and pressure using a roller or belt shaped fixing member so as to obtain a fixed image.

<15> An image forming method including developing a latent electrostatic image formed on an image bearing member using a toner so as to form a toner image, transferring the toner image formed on the image bearing member to a recording medium, and fixing the transferred toner image onto the recording medium by heat and pressure using a roller or belt shaped fixing member so as to obtain a fixed image, wherein the image forming method is performed by means of the process cartridge according to <13>.

<16> An image forming apparatus containing an image bearing member configured to bear a latent electrostatic image, a charging unit configured to uniformly charge a surface of the image bearing member, an exposing unit configured to expose the charged surface of the image bearing member imagewise on the basis of image data, a developing unit configured to supply the latent electrostatic image formed on the surface of the image bearing member with a toner to form a visible image, a transferring unit configured to transfer the visible image formed on the surface of the image bearing member to a recording medium, and a cleaning unit configured to clean the surface of the image bearing member after transferring the visible image, wherein the image bearing member is an organic photoconductors (OPC) or amorphous silicon photoconductor, and the developing unit contains the developer according to any one of <11> and <12>.

<17> The image forming apparatus according to <16>, further containing a heating unit equipped with a heat generator, a film which contacts with the heating unit, and a pressure member which makes pressure contact with the heating unit via the film, wherein the recording medium, on which an unfixed image is formed, is passed between the film and the pressure member so as to heat and fix the image.

<18> The image forming apparatus according to any one of <16> and <17>, wherein an alternating electric field is formed when the latent electrostatic image on the image bearing member is developed.

According to the present invention, a radically polymerizable monomer is polymerized in a pigment dispersion containing the radically polymerizable monomer, a pigment and a supercritical fluid or subcritical fluid, in which at least the radically polymerizable monomer is soluble, but polymer particles resulted from polymerization of the radically polymerizable monomer are insoluble, so as to produce uniformly colored polymer particles in high concentration, without blocking polymerization reaction. Thus, material cost saving, and shortening of production process can be achieved, and a method for producing colored polymer particles having excellent charge ability, aging characteristics and environmental property, can be provided at low cost.

According to the present invention, a radically polymerizable monomer composition containing a dye and a radically polymerizable monomer is polymerized in a supercritical fluid or subcritical fluid, in which the radically polymerizable monomer is soluble, but polymer particles resulted from polymerization of the radically polymerizable monomer are insoluble, so as to obtain uniformly colored polymer particles in high concentration, without blocking polymerization reaction. Thus, material cost saving, and shortening of production process can be achieved, and a method for producing colored polymer particles having excellent charge ability, aging characteristics and environmental property, can be provided at low cost.

Among supercritical fluids and subcritical fluids, supercritical carbon dioxide and subcritical carbon dioxide are incombustible and highly safe, and respectively work as a hydrophobic solvent, thus the surfaces of the colored polymer particles obtained using the supercritical carbon dioxide or subcritical carbon dioxide become also hydrophobic. The supercritical carbon dioxide and subcritical carbon dioxide evaporate at the normal temperature and pressure, so that they are easily separated and recovered from the colored polymer particles and recycled. Moreover, as the colored polymer particles are yielded in dried state, a dry step and waste liquid processing step are not necessary and a waste liquid is not generate. Therefore, all conventional problems are solved by using supercritical carbon dioxide or subcritical carbon dioxide as the supercritical fluid or subcritical fluid. A toner using the colored polymer particles has excellent toner properties, and a developer using the toner, which can achieve high quality image, can be provided.

Figure 1:
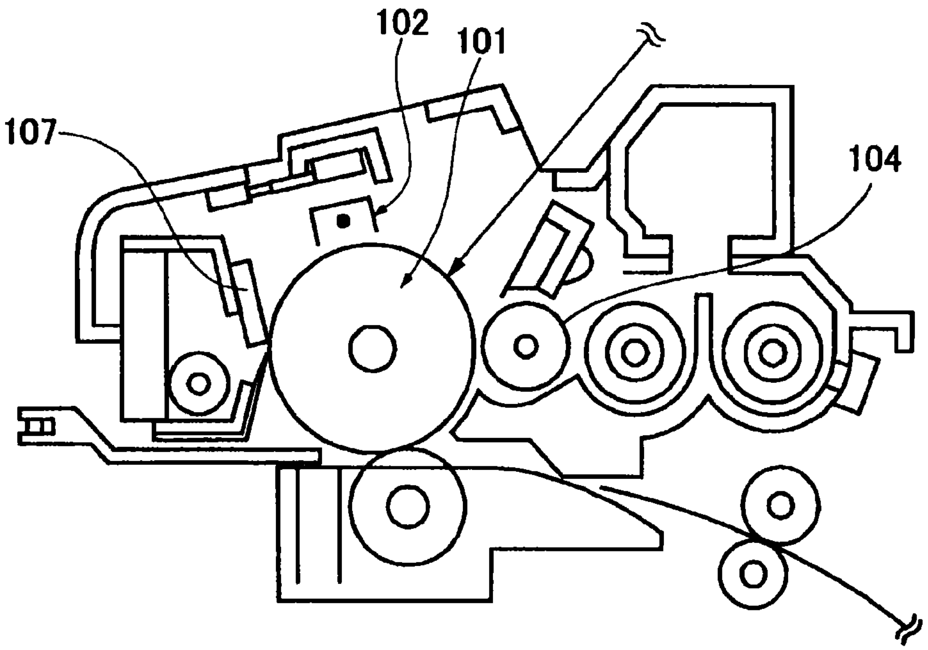
FIG. 1 shows a schematic configuration of an example of a process cartridge used in the present invention.

DETAILED DESCRIPTION OF THE INVENTION (Colored Polymer Particles and Production Method Thereof)

The colored polymer particles of the present invention can be obtained by a method for producing colored polymer particles of the present invention.

The method for producing colored polymer particles of the present invention includes at least a step of polymerizing a radically polymerizable monomer in a supercritical fluid or subcritical fluid so as to produce particles, and further includes appropriately selected other steps, as necessary.

Hereinafter, the colored polymer particles and toner of the present invention will be illustrated in detail through the explanation of the method for producing colored polymer particles of the present invention.

<Polymerization Step in Supercritical Fluid or Subcritical Fluid>

The polymerization step in a supercritical fluid or subcritical fluid of the present invention is a step of adding a colorant-containing composition containing a radically polymerizable monomer and a colorant in the supercritical fluid or the subcritical fluid and polymerizing the radically polymerizable monomer, so as to produce colored polymer particles which are insoluble in the supercritical fluid or subcritical fluid, wherein the supercritical fluid or subcritical fluid is a supercritical fluid or subcritical fluid in which at least the radically polymerizable monomer is soluble, but polymer particles resulted from polymerization of the radically polymerizable monomer are insoluble, and wherein the colorant is at least one selected from the group consisting of a pigment, a dye and a polymer dye.

In the first embodiment of the present invention, a polymerization step in a supercritical fluid or subcritical fluid is a step of polymerizing a radically polymerizable monomer in a pigment dispersion which contains the radically polymerizable monomer, a pigment and the supercritical fluid or subcritical fluid, so as to produce colored polymer particles, wherein the supercritical fluid or subcritical fluid is a supercritical fluid or subcritical fluid in which at least the radically polymerizable monomer is soluble, but polymer particles resulted from polymerization of the radically polymerizable monomer are insoluble. As the method for producing colored polymer particles using the supercritical fluid or subcritical fluid, dispersion polymerization can take advantage of the merit of using the supercritical fluid or subcritical fluid, and is superior to suspension polymerization or emulsion polymerization, in terms of monodispersity or narrow particle size distribution of the colored polymer particles.

In the dispersion polymerization method in the supercritical fluid or subcritical fluid, a surfactant, one or two or more kinds of radically polymerizable monomer(s) such as vinyl monomers and a pigment are used, wherein the surfactant is soluble in the supercritical fluid or subcritical fluid, and affects both the radically polymerizable monomer and the supercritical fluid or subcritical fluid, the radically polymerizable monomers are soluble, but a produced polymer therefrom swells or is hardly soluble in the supercritical fluid or subcritical fluid, and the pigment insoluble in the supercritical fluid or subcritical fluid. The dispersion polymerization method in the supercritical fluid or subcritical fluid also includes a reaction in which a radically polymerizable monomer is subjected to a growth reaction in the above-mentioned system by using a previously prepared polymer having a smaller particle diameter than a desired one but narrow particle size distribution. The radically polymerizable monomer utilized for the growth reaction may be the same as or different from the radically polymerizable monomer used for producing seed particles. However, the polymer should not be soluble in the supercritical fluid or subcritical fluid. A supercritical dispersion of the polymer obtained by such method is adjusted to the normal temperature and pressure so as to obtain dried colored polymer particles. As a method of polymerizing a pigment dispersion containing at least a pigment, a radically polymerizable monomer and a supercritical fluid or subcritical fluid, the following methods are exemplified: a method in which a dispersion is produced by dispersing a pigment in a supercritical fluid or subcritical fluid and a radically polymerizable monomer is added therein so as to obtain a pigment dispersion, which is subjected to polymerization; and a method in which a radically polymerizable monomer composition containing a pigment and a radically polymerizable monomer is produced, and the radically polymerizable monomer composition is dispersed in a supercritical fluid or subcritical fluid so as to form a pigment dispersion, which is subjected to polymerization.

The surfactant may be added in the supercritical fluid or subcritical fluid, or may be added in the radically polymerizable monomer composition.

In the second embodiment of the present invention, a polymerization step in a supercritical fluid or subcritical fluid is a step of dispersion-polymerizing a radically polymerizable monomer composition containing a dye and the radically polymerizable monomer in the supercritical fluid or subcritical fluid so as to produce colored polymer particles. The method of producing colored polymer particles using a supercritical fluid or subcritical fluid is as mentioned above.

In the dispersion polymerization method in the supercritical fluid or subcritical fluid, a surfactant, one or two or more kinds of radically polymerizable monomer(s) such as vinyl monomers and a dye are used, wherein the surfactant is soluble in the supercritical fluid or subcritical fluid, and affects both the radically polymerizable monomer and the supercritical fluid or subcritical fluid, and the radically polymerizable monomers are soluble, but a produced polymer therefrom swells or is hardly soluble in the supercritical fluid or subcritical fluid. The dispersion polymerization method in the supercritical fluid or subcritical fluid also includes a reaction in which a radically polymerizable monomer is subjected to a growth reaction in the above-mentioned system by using a previously prepared polymer having a smaller particle diameter than a desired one but narrow particle size distribution. The radically polymerizable monomer utilized for the growth reaction may be the same as or different from the radically polymerizable monomer used for producing seed particles. However, the polymer should not be soluble in the supercritical fluid or subcritical fluid. A supercritical dispersion of the polymer obtained by such method is adjusted to the normal temperature and pressure so as to obtain dried colored polymer particles.

The surfactant may be added in the supercritical fluid or subcritical fluid, or may be added in the radically polymerizable monomer composition.

In the third embodiment of the present invention, a polymerization step in a supercritical fluid or subcritical fluid is a step of polymerizing a radically polymerizable monomer in a polymer dye-containing liquid containing a polymer dye, the radically polymerizable monomer and the supercritical fluid or subcritical fluid so as to produce colored polymer particles which are insoluble in the supercritical fluid or subcritical fluid, wherein the supercritical fluid or subcritical fluid is a supercritical fluid or subcritical fluid in which at least the radically polymerizable monomer is soluble, but polymer particles resulted from polymerization of the radically polymerizable monomer are insoluble. The method for producing colored polymer particles using a supercritical fluid or subcritical fluid is as mentioned above.

"A surfactant which affects both a radically polymerizable monomer and a supercritical fluid or subcritical fluid" means a surfactant having affinity to both the radically polymerizable monomer and the supercritical fluid or subcritical fluid. For example, when supercritical carbon dioxide is used as the supercritical fluid, a surfactant has a group having affinity to $CO_2$ and a group having affinity to a monomer in a molecule. In this case, the group having affinity to $CO_2$ is not particularly limited, and examples thereof include a perfluoroalkyl group, polydimethylsiloxane group, ether group and carbonyl group. The group having affinity to a monomer is not particularly limited as long as it is a group having affinity to a radically polymerizable monomer used. The group having affinity to a monomer is preferably a polymer chain which is synthesized from a monomer (radically polymerizable monomer) used.

The surfactant which affects both the radically polymerizable monomer and the supercritical fluid or subcritical fluid is appropriately selected depending on the supercritical fluid or subcritical fluid used, the production of a desired polymer particles and seed particles or the production of growth particles. Particularly, those having high affinity and adsorptive property to a polymer particle surface, and further having high affinity and solubility to the supercritical fluid or subcritical fluid are selected in order to sterically prevent cohesion of polymer particles. Moreover, in order to enhance sterically repelling between particles, the surfactant having a certain length of a molecular chain, preferably having a molecular weight of 10,000 or more is selected. However, an excessively high molecular weight requires attention, because it causes significant rise of liquid viscosity, poor handleability and stirring ability, and variation in probability of adhesion of the surfactant to surfaces of produced polymer particles. Alternatively, the surfactant may be preliminarily coexisted with the radically polymerizable monomer so as to contribute to stabilization.

The amount of the surfactant differs depending on kinds of radically polymerizable monomers for forming desired polymer particles. It is preferably 0.1 mass % to 10 mass %, more preferably 1 mass % to 5 mass % with respect to the amount of the supercritical fluid or subcritical fluid. When the concentration of the surfactant is low, polymer particles having a relatively large diameter may be obtained. When the concentration of the surfactant is high, polymer particles having a small diameter may be obtained. The surfactant used in the amount of more than 10 mass % is not so effective to make a particle diameter smaller.

Moreover, a fine powder of an inorganic compound is used with the surfactant so as to further enhance stabilization of produced polymer particles and improvement of particle size distribution. For polymerization, the fine powder of the inorganic compound may be presented in the radically polymerizable monomer composition or seed particle dispersion liquid, both of which are added to prevent the cohesion of particles in growth reaction.

Initially produced particles are stabilized with the surfactant which is distributed to keep a balance between a polymer particle and the supercritical fluid or subcritical fluid. However, when a large number of unreacted radically polymerizable monomers are present in the supercritical fluid or subcritical fluid, the particles swell so as to have adhesion, overcoming the steric repulsive force of the surfactant, thereby aggregating the particles.

Moreover, when the amount of the radically polymerizable monomers are extremely large to the supercritical fluid or subcritical fluid, the produced polymer completely dissolved therein, and a polymer does not deposit on the surface until polymerization proceeds to some extent. In this case, the deposition state is formation of aggregation having high adhesion. Therefore, when the particles are produced, the amount of the monomer relative to the supercritical fluid or subcritical fluid is limited. The amount somewhat differs depending on kinds of the supercritical fluid or subcritical fluid, and it is preferably approximately 100 mass % or less, and more preferably 80 mass % or less.

In the present invention, a polymerization initiator can be used. The polymerization initiators used are common radical polymerization initiators. Examples thereof include azo polymerization initiators such as 2,2'-azobisisobutyronitrile (also referred to as AIBN), 2,2'-azobis(2,4-dimethylvaleronitrile), 1,1'-azobis(cyclohexane-1-carbonitrile); peroxide initiators such as, lauryl peroxide, benzoyl peroxide, tert-butyl peroctoate, methyl ethyl ketone peroxide, isopropyl peroxy carbonate, cumene hydroperoxide, 2,4-dichlorobenzoyl peroxide, potassium persulfate; and sodium hyposulfite, amine or the like are used therewith. The concentration of the polymerization initiator is preferably 0.1 parts by mass to 10 parts by mass relative to 100 parts by mass of the radically polymerizable monomer.

In the first embodiment of the present invention, for example, at first the surfactant is completely dissolved in the supercritical fluid or subcritical fluid, then the radically polymerizable monomer composition containing one or two or more radically polymerizable monomers, the polymerization initiator, and the like are added therein, so as to produce a pigment dispersion, and then the thus produced pigment dispersion is subjected to a polymerization reaction at a temperature corresponding to a decomposition rate of the polymerization initiator, while stirring at a sufficient speed to make the uniform flow in a reactor. The temperature is preferably 40° C. to 100° C., and particularly preferably 50° C. to 85° C.

In the second embodiment of the present invention, for example, at first the surfactant is completely dissolved in the supercritical fluid or subcritical fluid, then the radically polymerizable monomer composition containing a dye, one or two or more radically polymerizable monomers, the polymerization initiator, and the like are added therein, and then subjected to polymerization at a temperature corresponding to a decomposition rate of the polymerization initiator, while stirring at a sufficient speed of to make the uniform flow in a reactor. The temperature is preferably 50° C. to 100° C.

Since the temperature at the initial stage of the polymerization largely affects a particle diameter to be produced, it is preferable that the temperature is increased up to a temperature required for polymerization after the radically polymerizable monomer is added, the polymerization initiator is dissolved in a small amount of the supercritical fluid or subcritical fluid and then charged into the reactor. It is necessary for polymerization to sufficiently purge oxygen in the air from the reactor using inactive gas such as nitrogen gas, argon gas or carbon dioxide gas. If oxygen is insufficiently purged, fine particles are easily produced.

The time for polymerization requires 5 to 72 hours to perform polymerization in a high conversion. However, it is possible to increase a polymerizing speed by stopping the polymerization at a state where a desired particle diameter and a desired particle size distribution are obtained, sequentially adding the polymerization initiators, or performing reaction under high pressure.

In order to adjust an average molecular weight, compounds having a large chain transfer constant are made coexist to be polymerized. Examples of the compounds include a low molecular compound having a mercapto group, carbon tetrachloride, and carbon tetrabromide. Additionally, examples of compounds include halogenated hydrocarbons such as ethyl acetate dibromide, ethyl acetate tribromide, ethyl benzene dibromide, ethane dibromide, and ethane dichloride; hydrocarbons such as diazothioether, benzene, ethyl benzene, and isopropyl benzene; mercaptans such as tertiary dodecyl mercaptan, and n-dodecyl mercaptan, and disulfides such as diisopropyl xanthogen disulphide; thioglycolic acid and its derivatives such as thioglycolic acid, 2-ethylhexyl thioglycolate, butyl thioglycolate, methoxybutyl thioglycolate, and trimethylolpropane tris(thioglycolate) and ammonium thioglycolate; and thioglycerol.

The amount of the chain transfer agent is $10^{-3}$ mass % to 10 mass % relative to the radically polymerizable monomer. Particularly, when the chain transfer agent is preliminarily coexisted with the radically polymerizable monomer before polymerization is initiated, the size of the deposited core particles can be controlled by adjusting the molecular amount of the initially polymer produced.

When the chain transfer agent is added after deposition of core particles, the molecular amount of polymer particles to be produced is adjusted so as to obtain flowability when melted at a desired heat.

Moreover, in the dispersion polymerization of the present invention, the crosslinking agent described hereinbelow may be added so as to control the melt viscosity of the produced toner, thereby to produce a crosslinked polymer. The following common crosslinking agent may be appropriately used. Examples thereof includes divinylbenzene, divinylnaphthalene, divinyl ether, divinylsulfone, diethylene glycol dimethacrylate, triethylene glycol dimethacrylate, ethylene glycol dimethacrylate, polyethylene glycol dimethacrylate, diethylene glycol diacrylate, triethylene glycol diacrylate, 1,3-butylene glycol dimethacrylate, 1,6-hexane glycol dimethacrylate, neopentyl glycol dimethacrylate, dipropylene glycol dimethacrylate, polypropylene glycol dimethacrylate and 2,2'-bis(4-methacryloxydiethoxyphenyl) propane, 2,2'-bis(4-acryloxydiethoxyphenyl)propane, trimethylolpropane trimethacrylate, trimethylolpropane triacrylate, tetramethylolmethane tetraacrylate, dibrom neopentyl glycol dimethacrylate, and diallyl phthalate.

The colored polymer particles to be produced may be used as toner base particles. For example, an external additive is added to the colored polymer particles so as to obtain a toner.

Moreover, a magnetic powder may be contained in the colored polymer particles as an additive so as to use the colored polymer particles as a magnetic toner. As the magnetic powder, a material which is magnetized in a magnetic field for magnetization is used. Examples thereof include powder of ferromagnetic metals such as iron, cobalt, and nickel; and compounds of magnetite, hematite, and ferrite.

Other components which can be contained in the toner are not particularly limited and may be appropriately selected depending on the intended purposed. Examples thereof include inorganic fine particles, charge controlling agent, flowability improver, and cleaning improver.

The weight average molecular weight of the colored polymer particles (toner base particles) to be produced is not particularly limited and may be appropriately selected depending on the intended purpose. For example, it is preferably 1,000 or more, more preferably 2,000 to 10,000,000, and particularly preferably 3,000 to 1,000,000. When the weight average molecular weight is less than 1,000, hot offset resistance may be poor.

The glass transition temperature (Tg) of the colored polymer particles (toner base particles) to be produced is not particularly limited and may be appropriately selected depending on the intended purpose. For example, it is preferably 30° C. to 70° C., and more preferably 40° C. to 65° C. When the glass transition temperature (Tg) is less than 30° C., the heat resistance preservability of the toner may be degraded. When the glass transition temperature (Tg) is more than 70° C., low temperature fixing property may not be satisfactory.

—Supercritical Fluid and Subcritical Fluid—

As the supercritical fluid, any supercritical fluid can be used without particular limitation as long as it is a fluid that exists as a noncondensable high-density fluid in a temperature and pressure region exceeding a limit (critical point) where a gas and a liquid can coexist, does not condensate when being compressed, and is in a state of a critical temperature or more and a critical pressure or more, and a radically polymerizable monomer is soluble therein, but polymer particles resulted from polymerization of the radically polymerizable monomer are insoluble at least in the supercritical fluid, and may be appropriately selected depending on the intended purpose. For example, a supercritical fluid having a low critical temperature is preferable. In addition, as the subcritical fluid, any subcritical fluid can be used without particular limitation as long as it exists as a high-pressure liquid in a temperature and pressure region in the vicinity of the critical point, and a radically polymerizable monomer is soluble therein, but polymer particles resulted from polymerization of the radically polymerizable monomer are insoluble at least in the subcritical fluid, and may be appropriately selected depending on the intended purpose. Examples of the supercritical fluids or subcritical fluids include carbon monoxide, carbon dioxide, dinitrogen oxide, nitrogen, water, methanol, ethanol, methane, ethane, propane, 2,3-dimethylbutane, ethylene, benzene, chlorotrifluoromethane, and dimethyl ether. The supercritical fluid or subcritical fluid is appropriately selected depending on the radically polymerizable monomer to be used. Of these, carbon dioxide is particularly preferable, since this can easily reach a supercritical state at a critical pressure of 7.3 MPa and a critical temperature of 31° C., is incombustible, has easy handleability, and is excellent in toner property because of hydrophobicity, and no dry step is required for a toner obtained, and no waste liquid is generated.

Those exemplified as the supercritical fluid can be also preferably used as the subcritical fluid. The supercritical fluid or subcritical fluid may be used alone or in combination as a mixture.

In the first embodiment, the critical temperature and a critical pressure of the supercritical fluid or subcritical fluid are not particularly limited and may be appropriately selected depending on the intended purpose. The critical temperature is −200° C. to 200° C., preferably −100° C. to 150° C., and more preferably 0° C. to 100° C.

In the second embodiment, the critical temperature and a critical pressure of the supercritical fluid or subcritical fluid are not particularly limited and may be appropriately selected depending on the intended purpose. The critical temperature is −273° C. to 300° C., preferably 0° C. to 200° C., and more preferably 30° C. to 150° C.

Furthermore, in addition to the supercritical fluid and subcritical fluid, an organic solvent can be also used as an entrainer. The addition of an entrainer enables to control degree of solubility and plasticization in the supercritical fluid or subcritical fluid of constituting materials of the colored polymer particles. The organic solvent is not particularly limited, as long as a toner resin is insoluble therein at normal temperature and pressure (25° C., 0.1 MPa), and may be appropriately selected according to the purpose. Examples thereof include methanol, ethanol, propanol, ammonia, melamine, urea and thioethyleneglycol. The amount of the entrainer to be added is preferably 0.1% by mass to 10% by mass, and more preferably 0.5% by mass to 5% by mass.

—Radically Polymerizable Monomer—

The radically polymerizable monomer is not particularly limited as long as a polymer component resulted from polymerization is a resin used as a toner binder resin for image formation, and may be appropriately selected depending on the intended purpose. For example, radically polymerizable monomers having unsaturated double bond such as vinyl monomers are exemplified, and various radically polymerizable monomers are commercially available. Examples thereof include styrene compounds such as styrene, o-methyl styrene, m-methyl styrene, p-methyl styrene, p-methoxy styrene and p-ethyl styrene; methacrylate esters such as methyl acrylate, ethyl acrylate, propyl acrylate, n-butyl acrylate, isobutyl acrylate, n-octyl acrylate, dodecyl acrylate, 2-ethyl hexyl acrylate, stearyl acrylate, phenyl acrylate, dimethyl amino ethyl acrylate, diethyl amino ethyl acrylate, methyl methacrylate, ethyl methacrylate, propyl methacrylate, n-butyl methacrylate, isobutyl methacrylate, n-octyl methacrylate, dodecyl methacrylate, 2-ethyl hexyl methacrylate, stearyl methacrylate, phenyl methacrylate, dimethyl aminoethyl methacrylate, diethyl aminoethyl methacrylate; acrylonitrile; methacrylonitrile; and acrylamide.

—Surfactant—

Examples of surfactants which affect both the radically polymerizable monomer and the supercritical fluid or subcritical fluid, include fluorine group-containing vinyl monomers, homopolymers in which fluorine group-containing vinyl monomers are polymerized, and copolymers of fluorine group-containing vinyl monomers and other vinyl monomers. Examples of fluorine group-containing vinyl monomers include acrylate monomers and methacrylate monomers, which contains a perfluoroalkyl group. A number of these fluorine group-containing vinyl monomers are commercially available, for example, fluorine compound catalog from AZmax.co, and the fluorine group-containing vinyl monomers may be appropriately selected depending on the intended purpose.

The surfactant is preferably a surfactant having a partial structure expressed by General Formula (1). In General Formula (1), $R_1$ may be any one of a hydrogen atom, methyl group or lower alkyl group having 2 to 4 carbon atoms such as an ethyl group, propyl group, isopropyl group, n-butyl group, sec-butyl group, and tert-butyl group. $R_2$ may be a methylene group, ethylene group or alkylene group such as a propylene group, isopropylene group, 2-hydroxypropyl group, butylene group, and 2-hydroxybutylene group. Rf may be a perfluoroalkyl group having 7 to 10 carbon atoms, 1 to 6 carbon atoms or 11 to 20 carbon atoms.

As a general production method of a fluorine group-containing surfactant, for example, the polymer may be synthesized from polymerization of the fluorine group-containing vinyl monomer in a fluorine-containing solvent such as HCFC225. Alternatively, the fluorine group-containing surfactant which is synthesized using a supercritical carbon dioxide as a reaction solvent is preferably used in terms of decrease of environmental impact.

As other production methods of fluorine group-containing surfactants, bulk polymerization and living radical polymerization are exemplified. Hereinafter, the bulk polymerization and living radical polymerization will be explained.

In an inactive gas atmosphere such as nitrogen in a reactor under reduced or increased pressure, or at normal pressure, the bulk polymerization is initiated from a thermal radical generated from a polymerizable monomer by heating a monomer composition containing a polymerizable monomer, and/or the bulk polymerization is initiated from a racial generated from a radical polymerization initiator by adding a known radical polymerization initiator, such as 2,2'-azobisisobutyronitrile (hereinafter also referred to as AIBN), benzoyl peroxide or the like, to the monomer composition. The radical polymerization initiator is not particularly limited and may be appropriately selected depending on the intended purpose. Examples thereof include diacyl peroxides such as benzoyl peroxide, 2,4-dichlorobenzoyl peroxide, p-chlorobenzoyl peroxide, o-methylbenzoyl peroxide, bis-3,5,5-trimethyl cyclohexanol peroxide; dialkyl peroxides such as dicumyl peroxide, 2,5-dimethyl-2,5-di(tert-butyl peroxy) hexane, tert-butyl cumyl peroxide, di-tert-butyl peroxide, 1,3-bis(tert-butyl peroxy isopropyl)benzene; peroxyketals such as 1,1-di(tert-butyl peroxy)cyclohexane; alkyl peresters such as tert-butyl peroxy benzoate; organic peroxides such as percarbonate, e.g. diisopropyl peroxydicarbonate; and azo compounds such as 2,2'-azobisisobutyronitrile, 2,2'-azobis-2,4-dimethylvaleronitrile, 2,2'-azobis-cyclohexylnitrile, 1,1'-azobis-(cyclohexane-1-carbonitrile), 2-phenylazo-4-methoxy-2,4-dimethylvaleronitrile. These may be used alone or in combination. The amount of the radical polymerization initiator is preferably 0.01 parts by mass to 2 parts by mass, and more preferably 0.01 parts by mass to 1.5 parts by mass relative to 100 parts by mass of the polymerizable monomers. This is because most of the initiators may be used at the beginning of the polymerization, the polymerization may be hard to be completed if the amount of the initiators is less, and on the other hand, the amount of the generated radical may be larger and a polymer having sufficient molecular weight is hard to be obtained if the amount of the initiators is larger. The polymerization temperature is normally 50° C. to 220° C., and preferably 80° C. to 150° C.

Moreover, in the bulk polymerization, the molecular weight of produced polymers can be adjusted by adding a chain transfer agent. The chain transfer agent is not particularly limited as long as it can be normally used for the polymerization or copolymerization of the radically polymerizable monomer, and may be appropriately selected depending on the intended purpose. Examples thereof include mercaptans such as methyl mercaptan, tert-butyl mercaptan, decyl mercaptan, benzyl mercaptan, lauryl mercaptan, stearyl mercaptan, n-dodecyl mercaptan, tert-dodecyl mercaptan, mercaptoacetic acid, mercaptopropionic acid; alcohols such as methanol, propanol, butanol, isobutanol, tert-butanol, hexanol, benzyl alcohol, allyl alcohol; and halogenated hydrocarbons such as chloroethane, fluoroethane, trichloroethylene, carbon tetrachloride. Of these, mercaptans are preferable, and n-dodecyl mercaptan are more preferable. The chain transfer agent may be charged all at a time in a reactor before polymerization, or added continuously or sequentially during polymerization.

The amount of the chain transfer agent is usually 0.01 parts by mass to 1 part by mass, and preferably 0.05 parts by mass to 0.5 parts by mass relative to 100 parts by mass of the polymerizable monomers. When the amount is less than 0.01 parts by mass, it may be difficult to produce polymers because the viscosity of polymerization system becomes higher. On the other hand, when the amount is more than 1 part by mass, the molecular weight of produced polymers may be reduced.

The methods of terminating the polymerization is not particularly limited and may be appropriately selected from the known methods as long as a chain transfer of propagating radical is terminated and disappeared. For example, this is operated by following methods: adding 50 ppm to 5,000 ppm of a polymerization terminator to a polymer liquid; blowing oxygen and air to a polymer liquid; and cooling a polymer liquid to 40° C. or less. These may be used alone or in combination.

The polymerization terminator means an agent which immediately reacts with a radical generated from at least any one of a polymerizable monomer and a polymerization initiator, and changes the radical to a stable radical or a neutral substance by which subsequent polymerization is not occurred. The polymerization terminator is not particularly limited and may be appropriately selected depending on the intended purpose. Examples thereof include quinones such as p-benzoquinone, naphthoquinone, phenanthraquinone, 2,5-diphenyl-p-benzoquinone; hydroquinones such as hydroquinone, p-tert-butylcatechol, 2,5-di-tert-butyl hydroquinone, mono-tert-butyl hydroquinone; phenols such as di-tert-butyl paracresol-hydroquinone monomethyl ether, α-naphthol; organic and inorganic copper salts such as copper naphthenate; amidines such as acetamidine acetate, acetamidine sulfate; hydrazine salts such as phenylhydrazine hydrochloride, hydrazine hydrochloride; quaternary ammonium salts such as trimethyl benzyl ammonium chloride, lauryl pyridinium chloride, cetyltrimethylammonium chloride, phenyltrimethylammonium chloride; polyhydric phenols such as pyrogallol, tannic acid, resorcinol; and oximes such as a nitro compound.

As the living radical polymerization method, two living radical polymerization methods such as TEMPO (2,2,6,6-tetramethylpiperidinyl-1-oxy)method, an iodine transfer polymerization are preferably used. The TEMPO method can be referred to the report of M. K. Georges et al., Trends Polym. Sci., 2, p. 66, 1994. The iodine transfer polymerization method can be referred to the report of M. Tatemoto, Japanese Journal of Polymer Science and Technology, 49, p. 765, 1992.

In the TEMPO method, generally a stable nitroxy free radical (=N—O) is used as a radical capping agent. The radical capping agent is not limited and may be appropriately selected depending on the intended purpose. A cyclic hydroxylamine-derived nitroxy free radicals such as 2,2,6,6-substituted-1-piperidinyl oxyradical, and 2,2,5,5-substituted-1-pyrrolidinyl oxyradical are preferable. As the substituted group, alkyl groups having 4 or less carbon atoms such as methyl group and ethyl group are appropriate.

Examples of the nitroxy free radical compounds include 2,2,6,6-tetramethyl-1-piperidinyl oxyradical (TEMPO), 2,2,6,6-tetraethyl-1-piperidinyl oxyradical, 2,2,6,6-tetramethyl-4-oxo-1-piperidinyl oxyradical, 2,2,5,5-tetramethyl-1-pyrrolidinyl oxyradical, 1,1,3,3-tetramethyl-2-isoindolinyl oxyradical, and N,N-di-tert-butylamine oxyradical. In addition, in stead of the nitroxy free radical, a stable free radical such as the galvinoxyl free radical may be also used.

The radical capping agents are used in combination with a heat radical generator. It is presumable that the polymerization of addition-polymerizable monomer may be proceeded as a reactant resulted from a radical capping agent and a heat radical generator acts as a polymerization initiator. The ratio of the combination is not particularly limited and may be appropriately selected depending on the intended purpose, and 0.1 moles to 10 moles of the heat radical generator relative to 1 mole of the radical capping agent may be preferable.

The heat radical generator is not particularly limited and various compounds may be used, and preferably a peroxide and an azo compound which may generate a radical at polymerization temperature. The peroxides are not particularly limited. Examples of the peroxides include diacyl peroxides such as benzoyl peroxide and lauroyl peroxide; dialkyl peroxides such as dicumyl peroxide and di-tert-butyl peroxide; peroxydicarbonates such as diisopropyl peroxydicarbonate and bis(4-tert-butylcyclohexyl) peroxydicarbonate, alkyl peresters such as tert-butyl peroxyoctoate and tert-butyl peroxybenzoate. Of these, benzoyl peroxide is particularly preferable. Examples of the azo compounds include 2,2'-azobisisobutyronitrile, 2,2'-azobis(2,4-dimethylvaleronitrile, 2,2'-azobis(4-methoxy-2,4-dimethylvaleronitrile), and dimethyl azobis isobutyrate. Of these, dimethyl azobis isobutyrate is particularly preferable.

The solvents used for the living radical polymerization is not particularly limited, and may be appropriately selected depending on the intended purpose. Examples thereof include apolar solvents: cycloalkanes such as cyclohexane, cycloheptane; saturated carboxylic esters such as ethyl acetate, n-butyl acetate, isobutyl acetate, methyl proplonate, propylene glycol monomethyl ether acetate; alkyl lactones such as γ-butyrolactone; ethers such as tetrahydrofuran, dimethoxyethanes, diethoxyethanes; alkyl ketones such as 2-butanone, 2-heptanone, methyl isobutyl ketone; cycloalkyl ketones such as cyclohexanone, alcohols such as 2-propanol, propylene glycol monomethyl ether; aromatic series such as toluene, xylene, chlorobenzene; dimethylformamide; dimethyl sulfoxide; and dimethylacetamide; and N-methyl-2-pyrrolidone. These may be used alone or in combination. However, these solvents may not be used.

The reaction temperature in the living radical polymerization is preferably 40° C. to 150° C., and more preferably 50° C. to 130° C. The reaction time is preferably 1 hour to 96 hours, and more preferably 1 hour to 72 hours.

A pigment used in the first embodiment of the present invention is not particularly limited and may be appropriately selected from known pigments depending on the intended purpose. Examples thereof include as follow:

Examples of yellow pigments include cadmium yellow, mineral first yellow, nickel titanium yellow, navel yellow, Naphtol Yellow S, Hansa Yellow G, Hansa Yellow 10G, Benzidine Yellow GR, Quinoline Yellow Lake, Permanent Yellow NCG and tartrazine lake.

Examples of orange pigments include molybdenum orange, Permanent Orange GTR, pyrazolone orange, vulcan orange, indanthrene Brilliand Orange RK, Benzidine Orange G and Indanthrene Brilliand Orange GK.

Examples of red pigments include colcothar, cadmium red, Permanent Red 4R, lithol red, pyrazolone red, watchung red calcium salt, Lake red D, Brilliant Carmine 6B, eosine lake, Rhodamine Lake B, Alizarine Lake and Brilliant Carmine 3B.

Examples of violet pigments include Fast Violet B and Methyl Violet Lake.

Examples of blue pigments include cobalt blue, alkali blue, victoria blue lake, phthalocyanine blue, metal-free phthalocyanine blue, partially chlorinated phthalocyanine blue, fast sky blue, and Indanthrene Blue BC.

Examples of green pigments include chrome green, chrome oxide, Pigment Green B, and Malachite Green Lake.

Examples of black pigments include azine dyes such as carbon black, oil furnace black, channel black, lamp black, acetylene black and aniline black, metallic salt azo dyes, metallic oxides, and composite metallic oxides.

These may be used alone or in combination.

Particularly, Pigment Yellow PY93, PY128, PY155, PY180, PY74, Pigment Blue PB 15:3, Pigment Red PR122, PR269, PR184, PR57:1, PR238, PR146, PR185, Pigment Blue PB15:3, and carbon black are preferred.

The pigment may be used as a master batch in a composite with a resin as well. The resins are not particularly limited and may be appropriately selected from those known in the art depending on the intended purpose. Examples thereof include styrenes and polymers of the substitution product thereof, styrene copolymers, polymethylmethacrylate, polybutylmethacrylate, polyvinyl chloride, polyvinyl acetate, polyethylene, polypropylene, polyesters, epoxy resins, epoxy polyol resins, polyurethane resins, polyamide resins, polyvinyl butyral resins, polyacrylate resins, rosin, modified rosin, terpene resin, aliphatic or alicyclic hydrocarbon resins, aromatic petroleum resins, chlorinated paraffin and paraffin wax. These may be used alone or in combination.

Examples of styrenes or polymers of the substitution product thereof include polyester resins, polystyrene, poly(p-chlorostyrene) and polyvinyltoluene. Examples of styrene copolymers include styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-$\alpha$-methyl methacrylate copolymers, styrene-ethyl methacrylate copolymers, styrene-butyl methacrylate copolymers, styrene-$\alpha$-chloromethyl methacrylate copolymers, styrene-acrylonitrile copolymers, styrene-vinyl methyl ketone copolymers, styrene-butadiene copolymers, styrene-isoprene copolymers, and styrene-acrylonitrile-indene copolymers, styrene-maleic acid copolymers and styrene-maleate copolymers.

The master batch can be produced by mixing and kneading the resin for master batch and pigment under high shear force. An organic solvent may be preferably added to increase interaction between the pigment and the resin. A flushing method is preferably used to produce the master batch, because a wet cake of the pigment can be used directly without drying. The flushing method may be used in which an aqueous paste containing water and a pigment is mixed and kneaded together with the resin and the organic solvent so that the pigment approaches to the resin and then the water and the organic solvent are removed thereafter. For the mixing and kneading, a high shear dispersing machine such as a three roller mill or the like may be preferably used.

The amount of the pigment in the colored polymer particles is not particularly limited and may be appropriately selected depending on the intended purpose. It is preferably 0.1 mass % to 20 mass %, more preferably 1 mass % to 15 mass %, and particularly preferably 3 mass % to 10 mass %. In case where the colored polymer particles are used in a toner, when the amount of the pigment is less than 0.1 mass %, the coloring ability of the toner is decreased. On the other hand, when the amount is more than 20 mass %, the pigment is poorly dispersed in the toner, causing decrease of coloring ability or electric property of the toner.

Method for Producing Pigment Dispersion Used in the First Embodiment of the Present Invention A pigment dispersion used in the first embodiment of the present invention can be obtained by the following manner: the pigment is pulverized in the presence of media such as glass beads, zirconia beads, alumina beads or iron balls by a side graínder, paint shaker, ball mill or sand mill, and at least a mixture of the radically polymerizable monomer and the pigment is uniformly mixed or dissolved in a solvent, and then the radically polymerizable monomer composition, from which the media are removed, is introduced in a high pressure cell containing a supercritical fluid or subcritical fluid, and dispersed and mixed under sufficient shear force using a stirring device, thereby to obtain a pigment dispersion containing the pigment, the radically polymerizable monomer and the supercritical fluid or subcritical fluid, which is used in the first embodiment of the present invention.

Alternatively, examples of methods of mixing and dispersing with a supercritical fluid or subcritical fluid, include a method of introducing a supercritical fluid or subcritical fluid to a radically polymerizable monomer composition, a method in which a liquid is introduced to a radically polymerizable monomer composition and heated to be a supercritical state. Any method used for mixing and dispersing using the supercritical fluid or subcritical fluid can be appropriately used.

Alternatively, a pigment is dispersed in a supercritical fluid or subcritical fluid, and then a radically polymerizable monomer is added therein.

In the pigment dispersion composition, the pigment is in an amount of 0.1 parts by mass to 50 parts by mass, preferably 0.5 parts by mass to 30 parts by mass, and more preferably 1 part by mass to 20 parts by mass, relative to 100 parts by mass of the radically polymerizable monomer. When the amount of the pigment is less than 0.1 parts by mass, sufficient coloring ability cannot be obtained. When the amount of the pigment is more than 50 parts by mass, it is not preferable in terms of the aggregation, sedimentation or thickening of the pigment.

In the pigment dispersion used in the first embodiment of the present invention, a pigment dispersant known in the art may be used in combination.

Examples of the pigment dispersants include basic polymer copolymer dispersants, modified polyurethane dispersants, acid polymer copolymer dispersants, polyester dispersants, polymers of acrylic acid, methacrylic acid and esters thereof, and derivatives of colorants. Specific examples thereof include basic polymer copolymer dispersants such as "AJISPER PB711", "AJISPER PB821" and "AJISPER PB822" (manufactured by Ajinomoto Fine-Techno Co., Inc.), modified polyurethane dispersants such as "EFKA-4060", "EFKA-4080", "EFKA-7462", "EFKA-4015", "EFKA-4046", "EFKA-4047", "EFKA-4055", "EFKA-4050" (manufactured by EFKA Chemicals), and derivatives of colorants such as SOLSPERSE 22000 (manufactured by Avecia). The pigment dispersants are not limited thereto, dispersants besides the above described pigment dispersants can be used.

The amount of the pigment dispersant differs depending on a surface area of the pigment, and it is preferably in the mass ratio of 1% to 30% relative to the pigment.

In the pigment dispersion used in the first embodiment of the present invention, a releasing agent may be mixed in an amount of 0 part by mass to 20 parts by mass, preferably 0 part by mass to 15 parts by mass, and more preferably 0 part by mass to 10 part by mass relative to 100 parts by mass of the radically polymerizable monomer in the pigment dispersion.

A dye used in the second embodiment of the present invention is not particularly limited and may be appropriately selected depending on the intended purpose. Examples thereof include direct dyes, acid dyes, disperse dyes, cationic dyes, reactive dyes, sulfur dyes, oil-soluble dyes, and metal complex dyes. Of these, disperse dyes, oil-soluble dyes, and cationic dyes are preferable, and dyes which are at least partially soluble in the radically polymerizable monomer are preferable, and dyes which are entirely soluble therein are more preferable.

As the coloring mechanism in the supercritical fluid or subcritical fluid, a mechanism of supercritical dyeing may be used. This mechanism is explained as follows: at first resin particles are formed in the a supercritical fluid or subcritical fluid by polymerization, and a dye is partially dissolved in a solvent, and then taken in the resin particles according to the partition coefficient. Namely, because both the supercritical fluid and the radically polymerizable monomer are present around the resin particles as solvents, a dye soluble in the radically polymerizable monomer is preferably contained as the dye. Here, soluble means soluble at normal temperature and pressure.

Dyes are not particularly limited and examples thereof include Disperse Yellow (160, 114, 119, 49, 54, 211, 30, 288), Disperse Red (54, 60, 153, 73, 74, 92, 152, 177, 167, 179), Disperse Purple (28,31,63), Disperse Blue (366, 183, 56, 165, 60, 79), Disperse Brown 1, C.I. SOLVENT YELLOW (6, 9, 17, 31, 35, 100, 102, 103, 105), C.I. SOLVENT ORANGE (2, 7, 13, 14, 66), C.I. SOLVENT RED (5, 16, 17, 18, 19, 22, 23, 143, 145, 146, 149, 150, 151, 157, 158), C.I. SOLVENT VIOLET (31, 32, 33, 37), C.I. SOLVENT BLUE (22, 35, 63, 78, 83 to 86, 191, 194, 195, 104), C.I. SOLVENT GREEN (24, 25), and C.I. SOLVENT BROWN (3, 9), C.I. SOLVENT BLACK (5, 7, 29), Aizen SOT dyes such as Yellow-1, 3, 4, Orange-1, 2, 3, Scarlet-1, Red-1, 2, 3, Brown-2, Blue-1,2, Violet-1, Green-1, 2, 3, and Black-1, 4, 6, 8 (manufactured by Hodogaya Chemical Co., Ltd.); Sudan dyes such as Yellow-146, 150, Orange-220, Red-290, 380, 460, and Blue-670 (manufactured by BASF Japan, Ltd.); Diaresin Yellow-3G, F, H2G, HG, HC, HL, Diaresin Orange-HS, G, Diaresin Red-GG, S, HS, A, K, H5B, Diaresin Violet-D, Diaresin Blue-J, G, N, K, P, H3G, 4G, Diaresin Green-C, and Diaresin Brown-A (manufactured by Mitsubishi Chemical Industries. Ltd.); Oil Color Yellow-3G, GG-S, #105, Oil Color Orange-PS, PR, #201, Oil Color Scarlet-#308, Oil Color Red-5B, Oil Color Brown-GR, #416, Oil Color Green-BG, #502, Oil Color Blue-BOS, IIN, and Oil Color Black-HBB, #803, EB, EX (manufactured by Orient Chemical Industries, Ltd.); Sumiplast Blue-GP, OR, Sumiplast Red-FB, 3B, and Sumiplast Yellow FL7G, GC (manufactured by Sumitomo Chemical Co., Ltd.); and Kayaron Polyester Black EX-SF300, Kayaset Red-B, and Kayaset Blue-A-2R (manufactured by Nihon Kayaku Co., Ltd).

These may be used alone or in combination.

The dye may be used as a master batch in a composite with a resin as well. The resin is not particularly limited and may be appropriately selected from those known in the art depending on the intended purpose. Examples thereof include styrenes and polymers of the substitution products thereof, styrene copolymers, polymethylmethacrylate, polybutylmethacrylate, polyvinyl chloride, polyvinyl acetate, polyethylene, polypropylene, polyester resins, epoxy resins, epoxy polyol resins, polyurethane resins, polyamide resins, polyvinyl butyral resins, polyacrylic acid resins, rosin, modified rosin, terpene resins, aliphatic or alicyclic hydrocarbon resins, aromatic petroleum resins, chlorinated paraffin and paraffin wax. These may be used alone or in combination. The resins are preferably soluble in the radically polymerizable monomers.

Examples of the styrenes or polymers of the substitution products thereof include polyester resins, polystyrene, poly (p-chlorostyrene) and polyvinyltoluene. Examples of the styrene copolymers include styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-$\alpha$-chloromethyl methacrylate copolymers, styrene-acrylonitrile copolymers, styrene-vinyl methyl ketone copolymers, styrene-butadiene copolymers, styrene-isoprene copolymers, and styrene-acrylonitrile-indene copolymers, styrene-maleic acid copolymers and styrene-maleate copolymers.

The master batch can be produced by mixing and kneading the resin for master batch and the dye under high shear force. An organic solvent may be preferably added to increase interaction between the dye and the resin. A flushing method is preferably used to produce the master batch, because a wet cake of the dye can be used directly without drying. The flushing method may be used in which an aqueous paste containing water and a dye is mixed and kneaded together with the resin and the organic solvent so that the dye approaches to the resin and then the water and the organic solvent are removed thereafter. For the mixing and kneading, a high shear dispersing machine such as a three roller mill or the like may be preferably used.

The amount of the dye in the colored polymer particles is not particularly limited and may be appropriately selected depending on the intended purpose. It is preferably 0.1 mass % to 20 mass %, and more preferably 1 mass % to 15 mass %. In case where the colored polymer particles are used in a toner, when the amount of the dye is less than 0.1 mass %, the coloring ability of the toner is decreased. On the other hand, when the amount is more than 20 mass %, the dye is poorly dispersed in the toner, causing decrease of coloring ability and electric property of the toner.

Method for Producing Radically Polymerizable Monomer Composition Used in the Second Embodiment of the Present Invention A radically polymerizable monomer composition used in the second embodiment of the present invention at least contains the above-mentioned radically polymerizable monomer and a dye. When the dye is soluble in the radically polymerizable monomer, the dye and the radically polymerizable monomer are mixed to form a solution. When the dye is partially insoluble in the radically polymerizable monomer, the dye is pulverized in the presence of media such as glass beads, zirconia beads, alumina beads or iron balls by a side grainder, paint shaker, ball mill or sand mill, and uniformly mixed or dissolved in the radically polymerizable monomer, and then the media are removed to prepare a mixture of the dye and the radically polymerizable monomer.

In the radically polymerizable monomer composition, the dye is in an amount of 0.1 parts by mass to 50 parts by mass, preferably 0.5 parts by mass to 30 parts by mass, and more preferably 1 part by mass to 20 parts by mass, relative to 100 parts by mass of the radically polymerizable monomer. When the amount of the dye is less than 0.1 parts by mass, sufficient coloring ability cannot be obtained. When the amount of the dye is more than 50 parts by mass, it is not preferable in terms of the aggregation, sedimentation or thickening of the pigment.

In the second embodiment of the present invention, a releasing agent may be mixed in an amount of 0 part by mass to 50 parts by mass, preferably 0 part by mass to 30 parts by mass, and more preferably 0 part by mass to 20 parts by mass relative to 100 parts by mass of the radically polymerizable monomer in the radically polymerizable monomer composition.

A polymer dye used in the third embodiment of the present invention is a macromolecular dye. Examples of the polymer dyes are as follows: Japanese Patent Application Laid-Open (JP-A) No. 62-245268 discloses a polymer dye in which a bisphenol type dye is introduced into a polyester skeleton; JP-A No. 63-85644 discloses a polymer dye in which an azo dye having a vinyl group is polymerized; and a polymer dye in which a rhodamine dye is attached is disclosed in JP-A Nos. 1-147472, 1-147476, 1-161362, 1-161363, 1-161364, 1-161365, 1-164956, 1-164957, 1-164958, 1-164959, 1-173056, 1-173057, 1-173058, 1-173059, 1-173060, 1-173064, 1-173065, 1-173066, 1-173067, 1-173068, and 2-2575. Particularly preferred is a polymer dye obtained by reacting an acid resin having a sulfonic acid group and carboxyl group in a side chain group of a polymer with a basic dye.

In case where the polymer is a vinyl polymer having a sulfonic acid group and/or sulfate group in a side chain group of the polymer, examples of vinyl-based constituting monomers having a sulfonic acid group and/or its salt group, and/or sulfuric acid group and/or its salt group as a monomer unit, include groups derived from monomers, such as 2-(meth) acryloyloxy ethanesulfonic acid, 2-(meth)acryloyloxy propanesulfonic acid, 2-(meth)acrylamide-2-alkyl ($C_1$ to $C_4$) propanesulfonic acid, vinyl sulfonic acid, allyl sulfonic acid, styrene sulfonic acid, α-methyl styrene sulfonic acid, vinyl toluene sulfonic acid, vinylnaphthalene sulfonic acid and vinyl sulfuric acid. Of these, groups derived from monomers such as 2-(meth)acryloyloxy ethansulfonic acid, 2-(meth) acryloyloxy propanesulfonic acid, 2-(meth)acrylamide-2-alkyl ($C_1$ to $C_4$) propanesulfonic acid, and styrene sulfonic acid, are preferred. Groups derived from monomers such as 2-acrylamide-2-methyl propanesulfonic acid, and styrene sulfonic acid are more preferred. Groups derived from monomers such as 2-acrylamide-2-methyl propanesulfonic acid are still more preferred.

Each of these constituting monomers may be used in acid type, or a sulfonic acid and/or sulfate group of the constituting monomer is partially or wholly neutralized with base, and then a resultant salt may be used.

Examples of counter ions in salts formed by a sulfonic acid or sulfate group, include metal ions, ammonium ions, alkyl or alkenyl ammonium ions having total carbon atoms of 1 to 22, alkyl or alkenyl-substituted pyridinium ions having carbon atoms of 1 to 22, and alkanol ammonium ions having total carbon atoms of 1 to 22. Alkali metal ions such as sodium ions and potassium ions, or ammonium ions are preferred, and sodium ions and potassium ions are more preferred.

Examples of radically polymerizable monomers include styrene monomers such as styrene, α-methylstyrene, and divinylbenzene; alkyl ester monomers of acrylate or methacrylate such as methylacrylate, methylmethacrylate, ethylacrylate, ethylmethacrylate, n-butylmethacrylate, i-butylmethacrylate, t-butylmethacrylate, hexyl is acrylate, cyclohexyl acrylate, octyl acrylate, and 2-ethylhexyl acrylate; unsaturated carboxylic acid monomers such as acrylic acid, methacrylic acid, (anhydride) maleic acid, fumaric acid, and itaconic acid; nitrogen-containing acylate or methacrylate monomers such as dimethylamino acrylate, dimethylamino ethyl acrylate, diethylamino ethyl acrylate, diethylaminopropyl acrylate, N-aminoethyl aminopropylacrylate, dimethylamino methacrylate, dimethylaminoethyl methacrylate, diethylaminoethyl methacrylate, diethylaminopropyl methacrylate and N-aminoethyl aminopropyl methacrylate; or monomers such as 2-hydroxyethyl acrylate, 3-hydroxypropyl acrylate, 4-hydroxybutyl acrylate and 2-hydroxyethyl methacrylate. These may form a copolymer.

To enhance solubility in the radically polymerizable monomer as colored polymer particles (toner base), or enhance compatibility with a resin resulted from polymerization, styrene derivative monomers or alkyl ester monomers of acrylate or methacrylate may be preferably used.

These monomers are polymerized in water by introducing a common radically polymerizable monomer in a polymerization vessel with common radical polymerization initiators, for example, persulfate such as potassium persulfate, ammonium persulfate; organic peroxides such as cumene hydroperoxide, t-butyl hydroperoxide; azobisisobutyronitrile or azobisisovaleronitrile. Polymerization in an organic solvent can be performed depending on kinds and amount of a copolymerizable monomer.

When the amount of a monomer having a sulfonic acid group or sulfate group is small, coloring ability is poor. Therefore, the suitable amount of a monomer having acidic group is 10 mol % or more, and preferably 30 mol % or more.

Specific examples of those used as basic dyes include C. I. Basic Yellow 1, 2, 11, 13, 14, 19, 21, 25, 36, 28, 40, 73; C. I. Basic Orange 21, 22, 30; C. I. Basic Red 12, 13, 14, 18, 27, 36, 38, 39, 46, 69, 70; C. I. Basic Violet 7, 10, 11, 15, 16, 27, 28; C. I. Basic Blue 1, 4, 7, 9, 26, 35, 41, 65, 66, 67, 75, 77, 129; and C. I. Basic Green 4.

Between the basic dye and polymer, dye is proceeded by adjusting pH to 2 to 7, more preferably 3 to 5, at a temperature of 30° C. to 100° C., and preferably 50° C. to 80° C. The low temperature may extend reaction time too long, on the other hand, the high temperature may change material quality. The reaction time is 20 minutes to 2 hour when the temperature is 40° C. to 60° C. A solvent is not necessary water, but may be an organic solvent such as N-vinylpyrrolidone, acrylonitrile, or a mixed solvent of the organic solvent with water.

When the dye sufficiently proceeds, organic property of a polymer is increased, and the polymer becomes insoluble in water and the organic solvents such as N-vinylpyrrolidone and acrylonitrile. Thus, filtration and wash are repeated several times, and the resultant cake is dried to obtain a colorant as a reactant from a reaction between the polymer and a basic dye.

Moreover, the obtained polymer dye may be used after a soluble component thereof is extracted and purified using organic solvents, such as aromatic hydrocarbons, aliphatic hydrocarbons, esters, ketones, alicyclic hydrocarbons or the like. Examples of the solvents include toluene, xylene, isopentane, n-hexane, n-heptane, ethyl acetate, butyl acetate, acetone, methyl ethyl ketone and cyclohexane.

Here, when the glass transition temperature of the colorant, which is obtained by reacting the polymer with the basic dye, is 30° C. to 80° C., the thermal characteristics of a toner is not influenced by increased amount of the colorant.

Among the colorants (pigments, dyes, or polymer dyes) used in the present invention, those soluble in the radically polymerizable monomer can be used by dissolving directly in the radically polymerizable monomer. However, those insoluble in the radically polymerizable monomer, such as pigments, are preferably used with the radically polymerizable monomer to form a dispersion liquid.

A releasing agent will be exemplified hereinbelow.

The releasing agent is not particularly limited and may be appropriately selected from those known in the art depending on the intended purpose. Waxes, silicone oils and the like are suitable examples. Examples of waxes include low-molecular weight polyolefin waxes, synthesized hydrocarbon waxes, silicone waxes, natural waxes, petroleum waxes, high fatty acids and metal salts thereof, high fatty acid amides, and modifications of the above-listed waxes. These may be used alone or in combination.

Examples of the low-molecular weight polyolefin waxes include low-molecular weight polyethylene waxes and low-molecular weight polypropylene waxes.

Examples of the synthesized hydrocarbon waxes include Fischer-Tropsh wax.

Examples of the natural waxes include bee waxes, carnauba waxes, candelilla waxes, rice waxes, and montan waxes.

Examples of the petroleum waxes include paraffin waxes, and microcrystalline waxes.

Examples of the high fatty acids include stearic acid, palmitic acid, and myristic acid.

Examples of silicone oils include dimethyl silicone oil, methylphenyl silicone oil, methyl hydrogen silicone oil, polyether-modified silicone oil, epoxy-modified silicone oil, amino-modified silicone oil, carboxyl-modified silicone oil, mercapto-modified silicone oil, carbinol-modified silicone oil, methacryl-modified silicone oil, alkyl-modified silicone oil, phenol-modified silicone oil, fatty acid ester-modified silicone oil, vinyl-modified silicone oil, alkoxy-modified silicone oil and heterogeneous functional group-modified silicone oil. Of these, one or more of them may be appropriately selected.

The melting point of the releasing agent (wax) is not particularly limited and may be appropriately selected depending on the intended purpose. The melting point of the releasing agent is preferably 40° C. to 160° C., more preferably 50° C. to 120° C., and particularly preferably 60° C. to 90° C.

When the melting point of the releasing agent is less than 40° C., the wax may adversely affect thermal stability. When the melting point of the releasing agent is more than 160° C., it is likely that cold offset may occur during a low-temperature fixing process, and a paper sheet may wind itself around the fixing device.

The amount of the releasing agent in the toner is not particularly limited and may be appropriately selected depending on the intended purpose. It is preferably 0 part by mass to 40 parts by mass, and more preferably 3 parts by mass to 30 parts by mass.

When the amount is more than 40 parts by mass, low temperature fixing property may be adversely affected and image quality may be poor (excessively high glossiness).

By containing the releasing agent in the supercritical fluid or subcritical fluid and/or radically polymerizable monomer composition, colored polymer particles including the releasing agent can be obtained. The mechanism of including the releasing agent in the dispersion polymerization in the supercritical fluid or subcritical fluid has not been revealed, but the following two mechanisms are considered: (1) the releasing agent is dissolved by heat or plasticization effect in the supercritical fluid or subcritical fluid, and included in polymer particles by dispersion polymerization; and (2) the releasing agent partially dissolved in the supercritical fluid or subcritical fluid is taken (injected) into polymer particles according to distribution coefficient. From the TEM picture of the resultant colored polymer particles, lamellar can be observed inside the particles, allowing to confirm inclusion of the releasing agent.

The releasing agent may be mixed and dispersed with the pigment and radically polymerizable monomer so as to be contained in the radically polymerizable monomer composition. Alternatively, in order to finely disperse the releasing agent, the releasing agent dispersed in the radically polymerizable monomer so as to produce a dispersion liquid of the releasing agent, and then the dispersion liquid is dispersed by mixing the pigment and the radically polymerizable monomer.

The inorganic fine particle is not particularly limited and may be appropriately selected from those known in the art. Examples thereof include silica, alumina, titanium oxide, barium titanate, magnesium titanate, calcium titanate, strontium titanate, zinc oxide, tin oxide, silica sand, clay, mica, wollastonite, diatom earth, chrome oxide, cerium oxide, colcothar, antimony trioxide, magnesium oxide, zirconium oxide, barium sulfate, barium carbonate, calcium carbonate, silicon carbide and silicon nitride. These may be used alone or in combination.

The primary particle diameter of the inorganic fine particle is preferably 5 nm to 2 μm, and more preferably 5 nm to 500 nm. The specific surface of the inorganic file particle by BET method is preferably 20 $m^2/g$ to 500 $m^2/g$.

The amount of the inorganic fine particle in the toner is preferably 0.01 mass % to 5.0 mass %, and more preferably 0.01 mass % to 2.0 mass %.

The charge controlling agent is not particularly limited and may be appropriately selected from those known in the art. However, when a colored material is used for the charge controlling agent, the toner may show different tones of color and, therefore, colorless materials or materials having color close to white are preferably used. Examples of the charge controlling agents include nigrosine dyes, triphenylmethane dyes, chrome-containing metal complex dyes, molybdic acid chelate pigments, rhodamine dyes, alkoxy amines, quaternary ammonium salts (including fluoride-modified quaternary ammonium salts), alkylamides, phosphorus or compounds thereof, tungsten or compounds thereof, fluorine-containing surfactants, metal salts of salicylic acid, and metal salts of salicylic acid derivatives. In addition, the metals are not particularly limited and may be appropriately selected depending on the intended purpose. Examples of the metals include aluminum, zinc, titanium, strontium, boron, silicon, nickel, iron, chrome, and zirconium.

For the charge controlling agent, commercially available products may be used. Examples thereof include BONTRON P-51 of a quaternary ammonium salt, BONTRON E-82 of an oxynaphthoic acid metal complex, BONTRON E-84 of a salicylic acid metal complex, and BONTRON E-89 of a phenol condensate (manufactured by Orient Chemical Industries, Ltd.); TP-302 and TP-415, both are quaternary ammonium salt molybdenum metal complexes (manufactured by Hodogaya Chemical Co.); COPY CHARGE PSY VP2038, and COPY CHARGE NEG VP2036 and COPY CHARGE NX VP434, those are quaternary ammonium salts, COPY BLUE PR of a triphenylmethane derivative (manufactured by Hoechst Ltd.); LRA-901, and LR-147 of a boron metal complex (manufactured by Japan Carlit Co., Ltd.); quinacridones;

azo pigments; and high-molecular weight compounds having a functional group such as sulfonic acid, carboxylic acid and a quaternary ammonium salt.

The charge controlling agent may be dissolved and/or dispersed after melting and mixing with the master batch.

The amount of the charge controlling agent in the toner may be appropriately determined depending on kinds of binder resins, and kinds of additives, and cannot be categorically defined. The amount of the charge controlling agent is preferably 0.1 parts by mass to 10 parts by mass and, more preferably 1 part by mass to 5 parts by mass relative to 100 parts by mass of the binder resin. When the amount is less than 0.1 parts by mass, charge ability of the toner may be adversely affected. When the amount is more than 10 parts by mass, the charge ability of the toner becomes exceedingly enhanced, decreasing the effect of the charge controlling agent primarily used. Thus, an electrostatic suction force that presses toner against developing rollers increases, thereby decreasing the flowability of the developer and image density.

The flowability improver is an agent that improves hydrophobic properties of toner by surface treatment and is capable of preventing decrease of the flowability and charge ability under high humidity. Examples thereof include silane coupling agents, sililating agents, silane coupling agents having a fluorinated alkyl group, organotitanate coupling agents, aluminum coupling agents, silicone oils, and modified silicone oils.

The cleaning improver is added to the toner to remove a developer remaining on a photoconductor and on a primary transferring member after a transferring step. Examples thereof include fatty acid metal salts such as zinc stearate, calcium stearate, stearic acid, and polymer fine particles prepared by soap-free emulsion polymerization such as polymethylmethacrylate particles and polystyrene particles. Of these, polymer fine particles having a relatively narrow particle size distribution are preferable, and polymer fine particles having a weight average particle diameter of 0.01 μm to 1 μm are more preferable.

The shape and size of the toner are not particularly limited and may be appropriately selected depending on the intended purpose. The toner preferably offers the following thermal characteristics, image density, average circularity, weight average particle diameter, ratio of weight average particle diameter to number-average particle diameter (weight average particle diameter/number-average particle diameter), etc.

The thermal characteristics are also referred to flow tester characteristics, and are evaluated by softening temperature (Ts), flow-beginning temperature (Tfb), ½ method softening point (T1/2) and the like.

These thermal characteristics are measured by an appropriately selected method. For example, the thermal characteristics are obtained from a flow curve measured by means of a capillary flow tester CFT500 manufactured by Shimazu Corporation. The softening temperature (Ts) is not particularly limited, and may be appropriately selected depending on the intended purpose. It is preferably 50° C. or more, and more preferably 80° C. to 120° C. In the case where the softening temperature (Ts) is less than 50° C., at least one of the heat resistance preservability or low-temperature preservability may be degraded.

The flow-beginning temperature (Tfb) is not particularly limited, and may be appropriately selected depending on the intended purpose. It is preferably 60° C. or more, and more preferably 70° C. to 150° C. In the case where the flow-beginning temperature (Tfb) is less than 60° C., at least one of the heat resistance preservability or low-temperature preservability may be degraded.

The ½ method softening point (T1/2) is not particularly limited, and may be appropriately selected depending on the intended purpose. It is preferably 60° C. or more, and more preferably 80° C. to 170° C. In the case where the ½ method softening point (T1/2) is less than 60° C., at least one of the heat resistance preservability or low-temperature preservability may be degraded.

The image density is preferably 1.90 or more, more preferably 2.00 or more, and particularly preferably 2.10 or more, as determined using a spectrometer (938 SPECTRODENSITOMETER manufactured by X-Rite).

When the image density is less than 1.90, the image density may be low and thus high quality image may not be obtained.

The image density can be measured as follow: a solid image with a is deposited amount of 1.00±0.05 mg/cm$^2$ is formed on a copy sheet (Type 6000<70W>, manufactured by Ricoh Company, Ltd.) using IMAGIO NEO 450 (manufactured by Ricoh Company, Ltd.) having a fixing roller whose surface temperature is set to 160±2° C. Subsequently, the image densities of 6 randomly chosen points are measured using a spectrometer (938 SPECTRODENSITOMETER manufactured by X-Rite), followed by calculation of the mean of the measured values, thereby to obtain an image density.

Moreover, the image density of low deposited amount can be measured as follow: a solid image with a deposited amount of 0.3±0.1 mg/cm$^2$ was output on regular transfer paper (Type 6200, manufactured by Ricoh Company, Ltd.). Subsequently, the image densities of 6 randomly chosen points are measured using X-RITE (manufactured by X-Rite), followed by calculation of the mean of the measured values thereby to obtain an image density of low deposited amount. In this case, the image density is preferably 1.3 or more, more preferably 1.35 or more, and still more preferably 1.4 or more.

The average circularity is a value obtained by dividing the circumference of a circle that has the same area as an actual projected area of a toner particle by the circumference of that toner particle. It may be 0.850 to 1.000, preferably 0.900 to 0.980, and more preferably 0.950 to 0.975. Note that it is preferable that the proportion of particles having the average circularity of less than 0.940 be 15% or less of the total particles.

When the average circularity is less than 0.900, transfer properties may be unsatisfied and toner dust-free high quality images may not be obtained. When the average circularity is more than 0.980, cleaning failures may occur on a photoconductor and transfer belt in an image-forming system equipped with a cleaning blade, causing smears on images. For example, in a case of formation of an image that occupies a large area of a sheet (e.g., photographic images), background smears may occur, because, when paper feed failure or the like occurs, toner particles that have been used to develop the image remains unremoved and accumulates on the photoconductor, or, in that case, a charging roller which provides charges to the photoconductor in contact therewith becomes soiled by residual toner particles and thus its original charge ability may be impaired.

The average circularity is measured by a technique of optical detecting zone, in which a suspension liquid containing toner is passed through a detecting zone of an imaging part on a flat plate to optically detect images of particles by CCD camera and analyzed. For example, the average circularity can be measured using a flow particle image analyzer (FPIA-2100, manufactured by Sysmex Corp.).

The weight average particle diameter of the toner is not particularly limited and may be appropriately selected depending on the intended purpose. The weight average particle diameter is preferably 3 μm to 8 μm.

When the weight average particle diameter is less than 3 μm, in a case of two-component developer, a toner may be melted and adhered to a carrier surface to decrease its charge ability as a result of a long-time stirring in a developing unit, and in a case of a one-component developer, toner filming may occur at a developing roller or a toner may more likely to be melted and adhered to members such as a blade due to the thinned layer of the toner. When the weight average particle diameter is more than 8 μm, it becomes difficult to obtain images of high resolution and high quality, and the toner particle diameter may largely vary when new toner is added to the developer to compensate the consumed toner.

The ratio of a weight average particle diameter to a number-average particle diameter in a toner (weight average particle diameter/number-average particle diameter) is preferably 1.00 to 1.20, more preferably 1.00 to 1.15, and still more preferably 1.00 to 1.10, to obtained high resolution image. When this ratio exceeds 1.20, in a case of two-component developer, a toner may be melted and adhered to a carrier surface to decrease its charge ability as a result of a long-time stirring in a developing unit, and in a case of a one-component developer, toner filming may occur at a developing roller or a toner may more likely to be melted and adhered to members such as a blade because of its thinned layer of the toner. In addition, it becomes difficult to obtain images of high resolution and high quality, and the toner particle diameter may largely vary when toner is added to the developer to compensate the consumed toner.

The weight average particle diameter and the ratio of weight average particle diameter to number-average particle diameter can be determined by measuring a toner using, for example, COULTER COUNTER TA-II, COULTER MULTISIZER II, particle size analyzers manufactured by Coulter Electronics Ltd.

<Developer>

The developer of the present invention contains the toner of the present invention and appropriately selected other components such as a carrier. The developer may be either a one-component or a two-component developer; however, when it is applied to high-speed printers that support increasing information processing rates of recent years, a two-component developer is preferably used in view of achieving an longer life span.

In the case of a one-component developer containing the toner of the present invention, the variations in the toner particle diameter are minimized even after consumption or addition of toner, and toner filming to a developing roller and toner adhesion to members, such as a blade for decreasing layer thickness of the toner, are not occurred. Thus, it is possible to provide excellent and stable developing properties and images even after a long time usage (stirring) of the developing unit. Meanwhile, in the case of a two-component developer containing the toner of the present invention, even after many cycles of consumption and addition of toner, the variations in the toner particle diameter are minimized and, even after a long time stirring in the developing unit, excellent and stable developing properties may be obtained.

—Carrier—

The carrier is not particularly limited and may be appropriately selected depending on the intended purpose. However, the carrier having a core material and a resin layer coating the core material may be preferable.

The material for the core is not particularly limited and may be appropriately selected from known materials, for example, materials based on manganese-strontium (Mn—Sr), or materials based on manganese-magnesium (Mn—Mg), of 50 emu/g to 90 emu/g are preferable. From the standpoint of securing image density, high magnetizing materials such as iron powder (100 emu/g or more) and magnetite (75 emu/g to 120 emu/g) are preferable. In addition, weak magnetizing materials such as copper-zinc (Cu—Zn)-based materials (30 emu/g to 80 emu/g) are preferable from the standpoint of achieving higher-grade images by weakening the contact pressure against the photoconductor having standing toner particles. These materials may be used alone or in combination.

The particle diameter of the core material, in terms of weight average particle diameter, is preferably 10 μm to 150 μm, and more preferably 40 μm to 100 μm.

When the average particle diameter (weight average particle diameter ($D_{50}$)) is less than 10 μm, fine particles make up a large proportion of the carrier particle distribution, and magnetization per one particle may be decreased, thereby to cause carrier scattering. On the other hand, when it exceeds 150 μm, the specific surface area of the particle decreases, causing toner scatterings. Particularly, the reproducibility of solid images in full-color images may be poor, as the solid parts occupy a large area of the full-color images.

Materials for the resin layer are not particularly limited and may be appropriately selected from those known in the art depending on the intended purpose. Examples thereof include amino resins, polyvinyl resins, polystyrene resins, halogenated olefin resins, polyester resins, polycarbonate resins, polyethylene resins, polyvinyl fluoride resins, polyvinylidene fluoride resins, polytrifluoroethylene resins, polyhexafluoropropylene resins, copolymers of vinylidene fluoride and acrylic monomers, copolymers of vinylidene fluoride and vinyl fluoride, fluoroterpolymers such as terpolymers of tetrafluoroethylene, vinylidene fluoride and non-fluoride monomers, and silicone resins. These may be used alone or in combination.

Examples of the amino resins include urea-formaldehyde resins, melamine resins, benzoguanamine resins, urea resins, polyamide resins, and epoxy resins. Examples of the polyvinyl resins include acrylic resins, polymethyl methacrylate resins, polyacrylonitrile resins, polyvinyl acetate resins, polyvinyl alcohol resins, and polyvinyl butyral resins. Examples of the polystyrene resins include polystyrene resins, and styrene-acryl copolymer resins. Examples of the halogenated olefin resins include polyvinyl chloride. Examples of the polyester resins include polyethylene terephthalate resins, and polybutylene terephthalate resins.

The resin layer may contain such material as conductive powder as necessary. Examples of the conductive powders include metal powder, carbon black, titanium oxide, tin oxide and zinc oxide. These conductive powders preferably have an average particle diameter of 1 μm or less. When the average particle diameter is more than 1 μm, it may be difficult to control electrical resistance.

The resin layer may be formed in such a manner that the silicone resin or the like is dissolved into a solvent to prepare a coating solution, and the coating solution is uniformly coated on the surface of the core material by a known coating process, and then dried and baked. Examples of the coating processes include immersing, spray, and brush painting.

The solvent is not particularly limited and may be appropriately selected depending on the intended purpose. Examples thereof include toluene, xylene, methyl ethyl ketone, methyl isobutyl ketone, cellosolve, and butylacetate.

The baking process is not particularly limited and may be an externally heating process or an internally heating process. Examples thereof include a process using a fixed type electric furnace, a fluid type electric furnace, a rotary type electric furnace or a burner furnace, and a process using microwave.

The amount of the resin layer in the carrier is preferably 0.01% by mass to 5.0% by mass. When the amount is less than 0.01% by mass, it may be difficult to form a uniform resin layer on the surface of the core material. On the other hand, when the content is less than 5.0% by mass, the resin layer becomes so thick that carrier particles may associate together, thereby failing to obtain uniform carrier particles.

When the developer is a two-component developer, the amount of the carrier in the two-component developer is not particularly limited and may be appropriately selected depending on the intended purpose, for example, it is preferably 90% by mass to 98% by mass, and more preferably 93% by mass to 97% by mass.

Since the developer contains the toner of the present invention, it offers excellent charge ability upon formation of an image and can realize stable formation of high-quality images.

The developer can be suitably applied to a variety of known electrophotographic image-forming methods including a magnetic one-component developing method, non-magnetic one-component developing method, and two-component developing method, particularly suitably used to a toner container, process cartridge, image forming apparatus and image forming method used in the present invention, which will be explained hereinbelow.

<Toner Container>

The toner container used in the present invention is a container supplied with the toner or the developer of the present invention.

The toner container is not particularly limited and may be appropriately selected from those known in the art, for example, a toner container having a container main body and a cap is a suitable example.

The size, shape, structure and material of the container main body is not particularly limited and may be appropriately selected depending on the intended purpose. For example, the container main body may preferably have a cylindrical shape, and most preferably a cylindrical shape in which spiral grooves are formed on its inner surface that allow the toner in the container to shift to the outlet along with rotation of the main body, and in which all or part of the spiral grooves have a bellow function.

Materials for the container main body are not particularly limited and may be preferably those capable of providing accurate dimensions when fabricated, for example, resins are preferred. Specific examples thereof include polyester resins, polyethylene resins, polypropylene resins, polystyrene resins, polyvinyl chloride resins, polyacrylic acid resins, polycarbonate resins, ABS resins, and polyacetal resins. The toner container can be readily stored and transferred, and is excellent in handleability. The toner container can be suitably used to supply with the toner by detachably attaching it to a process cartridge, image forming apparatus or the like to be described later.

<Process Cartridge>

A process cartridge used in the present invention includes at least a latent electrostatic image bearing member configured to bear a latent electrostatic image and a developing unit configured to develop a latent electrostatic image borne on the latent electrostatic image bearing member using a developer to form a visible image, and further includes other units appropriately selected as necessary.

The developing unit includes at least a developer container configured to contain the toner or developer of the present invention and a developer bearing member configured to bear and convey the toner or developer contained in the developer container, and may further include a layer thickness control member configured to control the layer thickness of the toner to be borne on the developer bearing member, as necessary.

The process cartridge used in the present invention can be detachably equipped in various image forming apparatuses of electrophotography, and is preferably detachably equipped in the image forming apparatus used in the present invention to be described later.

An example of the process cartridge used in the present invention is shown in FIG. 1. Here, the process cartridge, for example, as shown in FIGS. 1, 101, 102, 104 and 107 denotes a image bearing member, a charging unit, a developing unit and a cleaning unit.

<Image Forming Method and Image Forming Apparatus>

An image forming method used in the present invention includes at least a latent electrostatic image forming step, a developing step, a transferring step, and a fixing step, and further includes other steps, for example, a charge eliminating step, a cleaning step, a recycling step, a controlling step, and the like, appropriately selected as necessary.

An image forming apparatus used in the present invention includes at least a latent electrostatic image bearing member, a latent electrostatic image forming unit, a developing unit, a transferring unit, and a fixing unit, and further includes other units, for example, a charge eliminating unit, a cleaning unit, a recycling unit, a controlling unit, and the like, appropriately selected as necessary.

The latent electrostatic image forming step is a step of forming a latent electrostatic image on the latent electrostatic image bearing member.

The latent electrostatic image bearing member (sometimes referred to as "photoconductor") is not particularly limited in material, shape, structure, size, and the like, and may be appropriately selected from those known in the art. The shape is preferably a drum shape, and examples of the materials include amorphous silicon and selenium of inorganic photoconductors and polysilane and phthalopolymethine of organic photoconductors (OPC). Of these, amorphous silicon or the like is preferable from the point of a long life span.

The latent electrostatic image can be formed by, for example, uniformly charging the surface of the latent electrostatic image bearing member and then exposing its surface imagewise by the latent electrostatic image forming unit. The latent electrostatic image forming unit includes at least, for example, a charger that uniformly charges the surface of the latent electrostatic image bearing member and an exposurer that exposes the surface of the latent electrostatic image bearing member imagewise.

The charging can be carried out by, for example, applying voltage to the surface of the latent electrostatic image bearing member by use of the charger.

The charger is not particularly limited and may be appropriately selected depending on the intended purpose. Examples thereof include a contact charger which is known by itself provided with a conductive or semiconductive roll, brush, film, rubber blade, or the like, and a noncontact charger using a corona discharge such as a corotron or scorotron.

The latent electrostatic image can be formed by, for example, uniformly charging the surface of the latent electrostatic image bearing member and then exposing its surface imagewise by the latent electrostatic image forming unit.

The latent electrostatic image forming unit is not particularly limited as long as it can imagewisely exposes the charged surface of the latent electrostatic image bearing member by the charger, and may be appropriately selected depending on the intended purpose. Examples thereof includes at least, for example, a charger that uniformly charges the surface of the latent electrostatic image bearing member and an exposurer that exposes the surface of the latent electrostatic image bearing member imagewise. The exposure can be carried out by, for example, exposing the surface of the latent electrostatic image bearing member imagewise by use of the exposurer.

The exposurer is not particularly limited as long as it is capable of exposing imagewise on the surface of the latent electrostatic image bearing member which has been charged by the charger and may be appropriately selected according to the purpose. Examples thereof include various exposurers such as a copying optical system, a rod lens array system, a laser optical system, and a liquid crystal shutter optical system.

Here, in the present invention, a backlight system for exposing the latent electrostatic image bearing member imagewise from the rear surface side may be employed.

—Developing Step and Developing Unit—

The developing step is a step of developing the latent electrostatic image using the toner or the developer of the present invention so as to form a visible image.

The visible image can be formed by, for example, developing the latent electrostatic image using the toner or the developer of the present invention by the developing unit.

The developing unit is not particularly limited, for example, as long as it can develop the latent electrostatic image using the toner or the developer of the present invention, and may be appropriately selected from those known in the art. For example, a suitable developing unit is one that includes at least a developing device which contains the toner or the developer of the present invention and can supply the latent electrostatic image with the toner or the developer in a contact or noncontact manner, and a developing device equipped with the toner container is more preferable.

The developing device can employ either a dry developing system or a wet developing system, and can be either a single-color developing device or a multi-color developing device. Examples thereof include one including a stirrer that frictionally stirs the toner or the developer so as to be charged and a rotatable magnet roller.

In the developing device, for example, the toner and the carriers are mixed and stirred, the toner is charged by friction at that time and is held in a standing state on the surface of the rotating magnet roller to form a magnetic brush. Since the magnet roller is arranged in the vicinity of the latent electrostatic image bearing member (photoconductor), a part of the toner constituting the magnetic brush formed on the surface of the magnet roller is moved to the surface of the latent electrostatic image bearing member (photoconductor) by an electrical suction force. As a result, the latent electrostatic image is developed with the toner to form a visible image (toner image) on the surface of the latent electrostatic image (photoconductor).

A developer contained in the developing device is a developer containing the toner of the present invention. The developer may be either a one-component or a two-component developer. The toner contained in the developer is the toner of the present invention.

In the developing step, alternating-current electric voltage is preferably applied.

Figure 6:
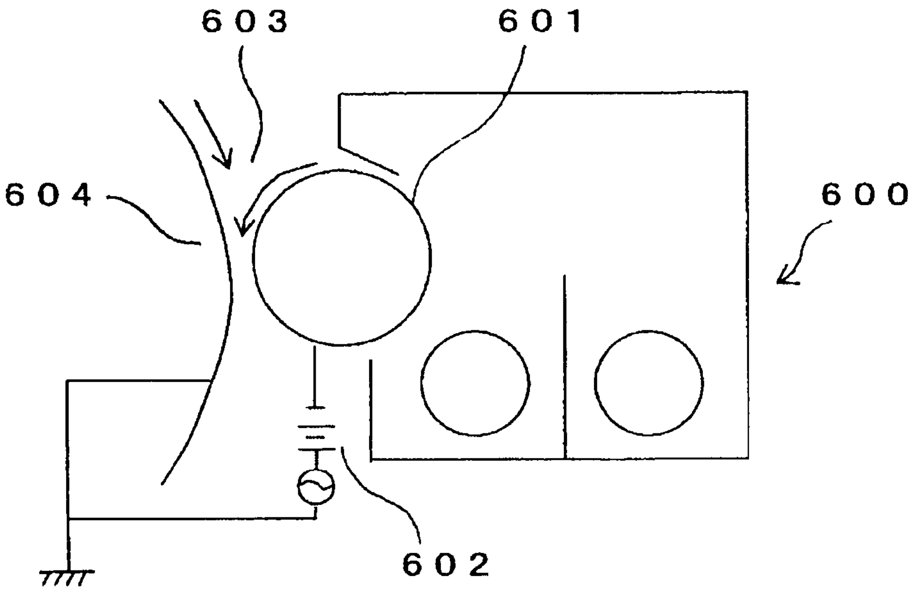
FIG. 6 shows a schematic configuration of an example of a developing unit of an image forming apparatus used in the present invention.

FIG. 6 is a view for illustrating a unit of applying alternating-current electric voltage in the developing step. In a developing device 600 shown in FIG. 6, upon developing, a power source 602 applies to a developing sleeve 601 a vibration bias voltage which is a developing bias voltage caused by overlapping a direct-current voltage with an alternating-current voltage. A back part potential and an image part potential are positioned between a maximum value and a minimum value of the above vibration bias potential, to thereby form on a developing part 603 the alternating electric field alternately changing the direction. In the alternating electric field, the toner and carrier in the developer may vibrate hard, thereby the toner may jet to the photoconductor drum 604 against an electrostatic biding force to the developing sleeve 601 and the carrier. Then, the toner may be adhered in such a manner as to correspond to a latent image of the photoconductor drum 604.

The vibration bias voltage has, preferably, the difference (peak-peak voltage) between the maximum value thereof and the minimum value thereof in a range of 0.5 kV to 5 kV and a frequency 1 kHz to 10 kHz. The vibration bias voltage may have a waveform such as rectangular wave, sine wave, triangular wave and the like. As described above, the direct-current voltage of the vibration bias is a value between the potentials of the background and image as mentioned above, and the value is preferably closer to the potential of the background than to that of the image to prevent foggy images in a potential area of the background, or a toner adhesion.

When the vibration bias voltage has a rectangular waveform, it is desirable that a duty ratio be 50% or less. Here, the duty ratio is a time ratio while the toner moves toward the photoconductor in a cycle of the vibration bias. In this way, the difference between a peak value of the toner moving toward the photoconductor and an average time of the bias can be large. Consequently, the movement of the toner becomes further activated hence the toner is accurately adheres to the potential distribution on a surface of a latent image, and surface roughness and an image resolution can be improved. Moreover, the difference between a peak value of the carrier, having a charge of the opposite polarity to the toner, moving toward the photoconductor and an average time of the bias can be small. Therefore, the movement of the carrier can be restrained and the possibility of the carrier adhesion to the background of a latent image can largely be reduced.

—Transferring Step and Transferring Unit—

The transferring step is a step of transferring the visible image to a recording medium. It is preferable to primarily transfer the visible image onto the intermediate transfer medium using an intermediate transfer medium, and then secondarily transfer the visible image onto the recording medium, and it is more preferable that the transferring step includes a primary transfer step of transferring the visible image onto the intermediate transfer medium to form a compound transfer image using toners of two or more colors, preferably, full-color toners, and a secondary transfer step of transferring the compound transfer image to a recording medium.

The transferring step is carried out by, for example, charging the visible image onto the latent electrostatic image bearing member (photoconductor) using a transfer charger by means of the transferring unit. The transferring unit preferably includes a primary transferring unit configured to transfer the visible image onto the intermediate transfer medium to form a compound transfer image and a secondary transferring unit configured to transfer the compound transfer image onto the recording medium.

The intermediate transfer medium is not particularly limited and may be appropriately selected from those known in the art depending on the intended purpose, and examples thereof include a transfer belt.

The transferring unit (the primary transferring unit and the secondary transferring unit) preferably includes at least a transfer device that separates and charges the visible image formed on the latent electrostatic image bearing member (photoconductor) onto the recording medium side. One or a plurality of transferring units may be provided.

Examples of the transfer devices include a corona transfer device using corona discharge, a transfer belt, a transfer roller, a pressure transfer roller, and an adhesion transfer device.

Here, the recording medium is not particularly limited and may be appropriately selected from known recording media (recording paper).

The fixing step is a step of fixing the transferred visible image onto the recording medium using a fixing device, and this may be carried out for toners of respective colors every time these are transferred to the recording medium or may be simultaneously carried out for the toners of respective colors in a laminated state at a time.

The fixing device is not particularly limited and may be appropriately selected depending on the purpose, for example, a known heating pressure unit is preferably used. The heating pressure unit is preferably configured to fix the transferred visible image by heat and pressure using a roller or belt shaped fixing member. Examples of the heating pressure units include a combination of a heating roller and a pressure roller, and a combination of a heating roller, a pressure roller and an endless belt.

Usually, heating by the heating pressure unit is performed preferably at 80° C. to 200° C.

In the present invention, for example, a known optical fixing device may be used in combination with the fixing step and fixing unit or in place of these, depending on the intended purpose.

In a preferable aspect, a device contains a heating unit equipped with a heat generator; a film which contacts with the heating unit; and a pressure member which makes pressure contact with the heating unit via the film, wherein a recording medium, on which an unfixed toner image is formed, is passed between the film and the pressure member so as to heat and fix a toner image.

Figure 7:
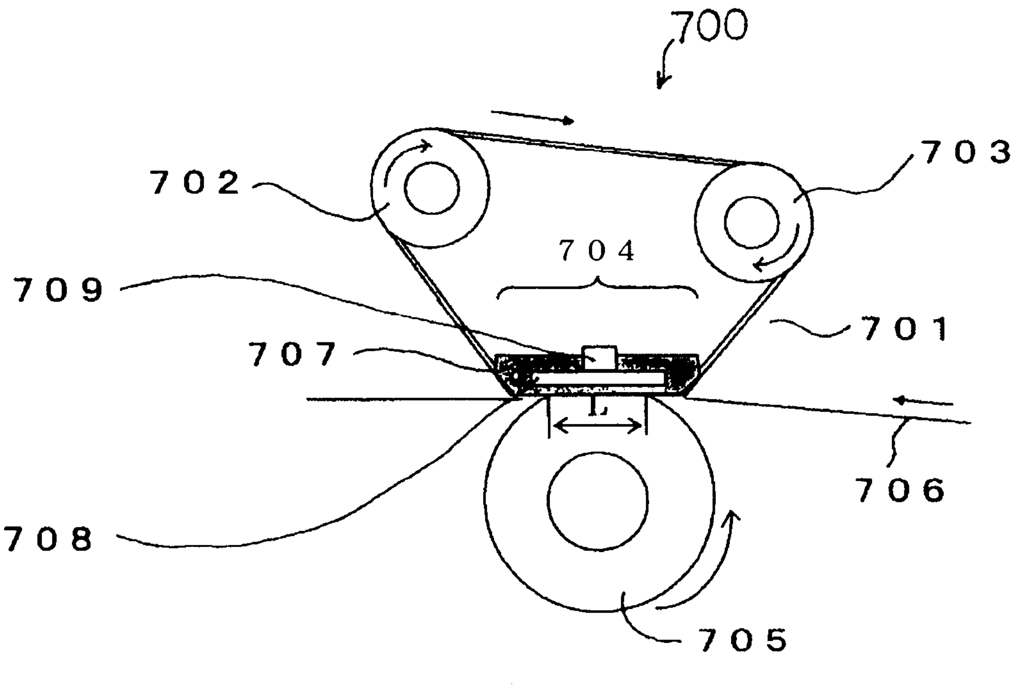
FIG. 7 shows a schematic configuration of an example of a fixing unit of an image forming apparatus used in the present invention.

FIG. 7 is a view illustrating the above-described heating and fixing unit. The fixing device used for the unit is a so-called surf fixing device 700, in which a fixing film is rotated to fix an image, as shown in FIG. 7. In this surf fixing device, the fixing film 701 is a heat resistant film having the shape of an endless belt, which is stretched around support rotators, a driving roller 702, driven roller 703 and heating member 704 which is fixedly supported by a heater supporter located between and below both of these rollers.

The driven roller 703 also serves as a tension roller of the fixing film 701, and the fixing film 701 rotates clockwise due to a clockwise rotation, shown in the figure, of the driving roller 702. This rotational speed of the fixing film 701 is adjusted to be equivalent to the speed of a transfer material 706 at a fixing nip area L where a pressure roller 705 and the fixing film 701 contact each other.

Here, the pressure roller 705 has a rubber elastic layer having good releasability such as silicone rubbers, and rotates counterclockwise while pressure contacting the fixing nip area L at an overall contact pressure of from 4 kg to 10 kg.

The fixing film 701 is preferably excellent in heat resistance, releasability and durability, and its total thickness is 100 μm or less, preferably 40 μm or less. Examples thereof include a monolayer film of heat resistant resin such as polyimide, polyetherimide, polyethersulfide (PES), PFA (a tetrafluoroethylene-perfluoroalkylvinylether copolymer resin); and multi-layer film containing, for example, a 20 μm thick base layer, and, in the side coming in contact with the image, a 10 μm thick parting layer of fluoro-resin such as PTFE (tetrafluoro-ethylene resin), PFA, or the like, which is coated on the base layer and contains electrically conductive material, or an elastic layer of e.g. a fluorocarbon rubber or a silicone rubber, which is coated on the base layer.

In FIG. 7, the heating member 704 is composed of a flat substrate 707 and a fixing heater 708, and the flat substrate 707 is formed of a material having a high heat conductivity and a high electric resistance such as alumina. A fixing heater 708 formed of a resistance heat generator is arranged on a surface of the heating member contacting the fixing film 701 in the longitudinal direction. The fixing heater 708 is one obtained by coating an electric resistant material such as Ag/Pd and $Ta_2N$ by a screen printing or the like so as to have a linear shape or belt shape. Both ends of the fixing heater have electrodes (not shown) and the resistance heat generator generates a heat when electricity passes though the electrodes. Further, a fixing temperature sensor 709 formed of a thermistor is provided to the substrate on the surface opposite to the surface on which the fixing heater 708 is arranged.

Temperature information of the substrate detected by the fixing temperature sensor 709 is transmitted to a controller (not shown), then the controller controls an electric energy supplied to the fixing heater, and the heating member 704 to a predetermined temperature.

Such fixing unit is efficient and can shorten the rise time.

The charge eliminating step is a step of charge eliminating by applying a charge eliminating bias to the latent electrostatic image bearing member by a charge eliminating unit.

The charge eliminating unit is not particularly limited as long as it can apply a charge eliminating bias to the latent electrostatic image bearing member, and may be appropriately selected from known charge eliminating devices. Examples thereof include a charge eliminating lamp.

The cleaning step is a step of removing the toner remaining on the latent electrostatic image bearing member and preferably carried out by a cleaning unit.

The cleaning unit is not particularly limited as long as it can remove the toner remaining on the latent electrostatic image bearing member, and may be appropriately selected from known cleaners. Examples thereof include a magnetic brush cleaner, an electrostatic brush cleaner, a magnetic roller cleaner, a blade cleaner, a brush cleaner, and a web cleaner.

The recycling step is a step of recycling the toner removed by the cleaning step to the developing unit, and can be preferably carried out by a recycling unit.

The recycling unit is not particularly limited and may be appropriately selected from known conveying units.

The controlling step is a step of controlling the respective steps, and can be preferably controlled by a controlling unit.

The controlling unit is not particularly limited as long as it can control operations of the respective units, and may be appropriately selected depending on the intended purpose. Examples thereof include devices, such as sequencers and computers.

Hereinafter, an aspect in which the image forming method in the present invention is carried out by the above-mentioned image forming apparatus will be explained with reference to FIG. 2. An image forming apparatus 100 shown in FIG. 2 includes a photoconductor drum 10 (hereinafter, referred to as "photoconductor 10") serving as the latent electrostatic image bearing member, a charging roller 20 serving as the charging unit, an exposure 30 serving as the exposing unit, a developing device 40 serving as the developing unit, an intermediate transfer medium 50, a cleaning device 60 serving as the cleaning unit having a cleaning blade, and a charge eliminating lamp 70 serving as the charge eliminating unit.

The intermediate transfer medium 50 is an endless belt, which is stretched around three rollers 51 so as to be movable in the arrow direction. A part of the three rollers 51 also functions as a transfer bias roller that is capable of applying a predetermined transfer bias (primary transfer bias) to the intermediate transfer medium 50. For the intermediate transfer medium 50, arranged in the vicinity thereof is a cleaning device 90 having a cleaning blade, and arranged opposing thereto is a transfer roller 80 serving as the transferring unit capable of applying a transfer bias to transfer (secondary transfer) a visible image (toner image) onto a transfer sheet 95. Around the intermediate transfer medium 50, arranged is a corona charger 58 for applying a charge to the visible image on the intermediate transfer medium 50, in the rotating direction of the intermediate transfer medium 50, between a contact portion between the photoconductor 10 and the intermediate transfer medium 50 and a contact portion between the intermediate transfer medium 50 and the transfer sheet 95.

The developing device 40 consists of a developing belt 41 serving as the developer bearing member and a black development unit 45K, a yellow development unit 45Y, a magenta development unit 45M, and a cyan development unit 45C provided side by side around the developing belt 41. The black development unit 45K includes a developer containing portion 42K, a developer supply roller 43K, and a developing roller 44K. The yellow development unit 45Y includes a developer containing portion 42Y, a developer supply roller 43Y, and a developing roller 44Y. The magenta development unit 45M includes a developer containing portion 42M, a developer supply roller 43M, and a developing roller 44M. The cyan development unit 45C includes a developer containing portion 42C, a developer supply roller 43C, and a developing roller 44C. In addition, the developing belt 41 is an endless belt, which is rotatably stretched around a plurality of belt rollers and a part of which contacts with the photoconductor 10.

Figure 2:
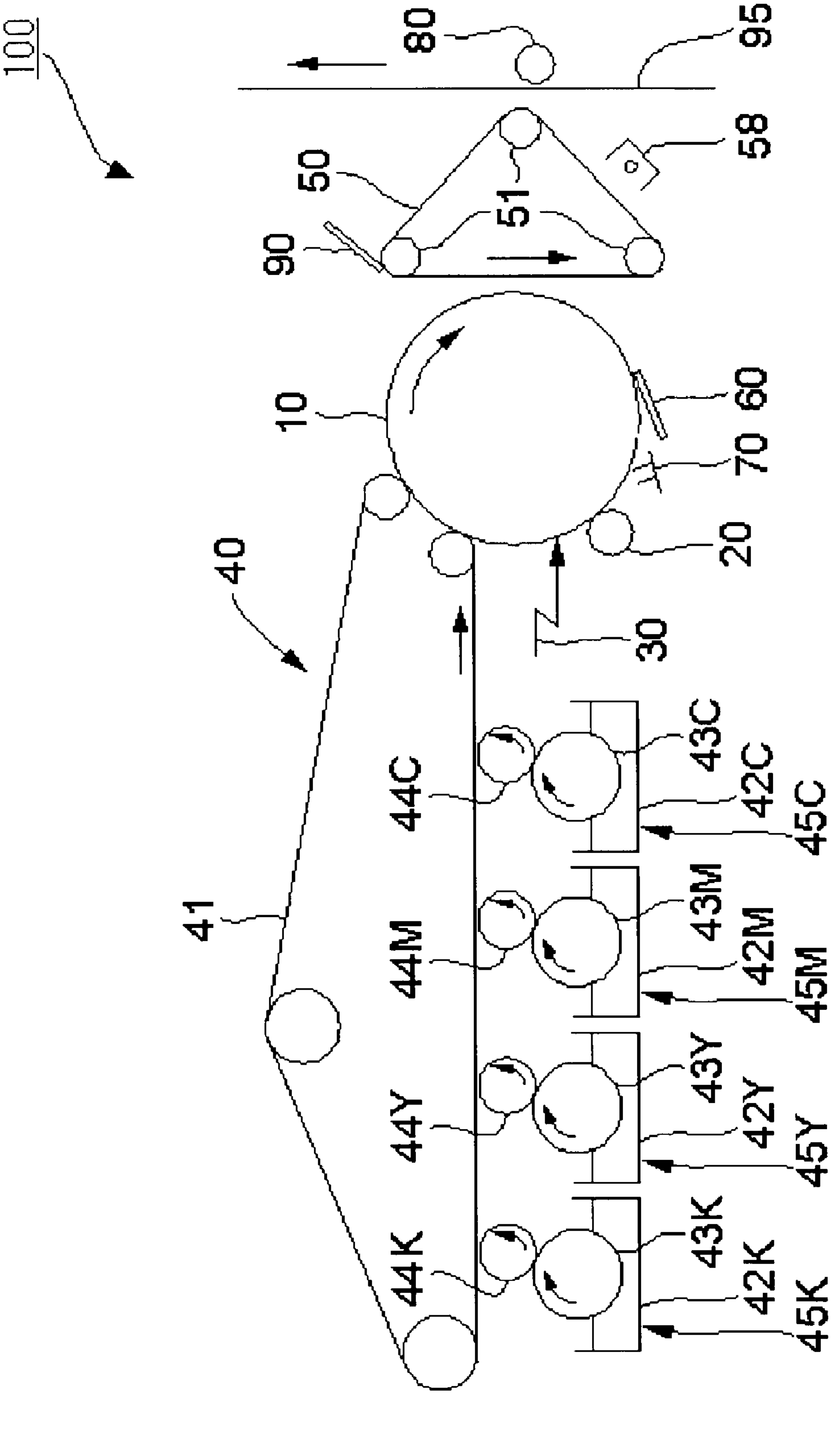
FIG. 2 shows a schematic configuration of an example of an image forming apparatus used in the present invention.

In the image forming apparatus 100 shown in FIG. 2, for example, the charging roller 20 uniformly charges the photoconductor drum 10. The exposure 30 carries out imagewise on the photoconductor drum 10 to form a latent electrostatic image. The latent electrostatic image formed on the photoconductor drum 10 is developed by supplying it with a toner from the developing device 40 to form a visible image (toner image). The visible image (toner image) is transferred (primary transfer) onto the intermediate transfer medium 50 by a voltage applied from the rollers 51 and is further transferred (secondary transfer) onto the transfer sheet 95. As a result, a transfer image is formed on the transfer sheet 95. Here, a residual toner on the photoconductor 10 is removed by the cleaning device 60, and charging on the photoconductor 10 is once removed by the charge eliminating lamp 70.

Figure 3:
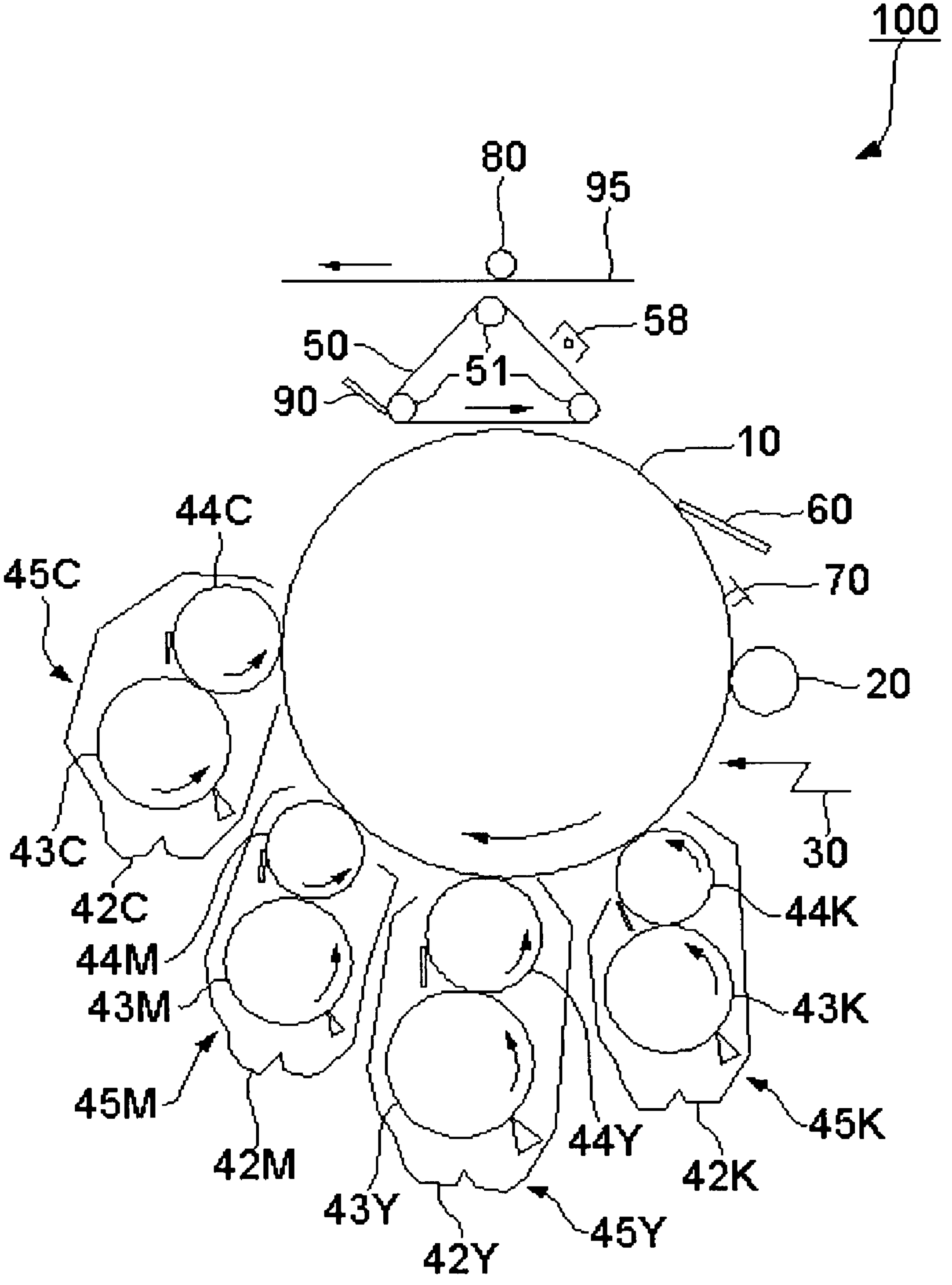
FIG. 3 shows a schematic configuration of another example of an image forming apparatus used in the present invention.

Another aspect for carrying out the image forming method in the present invention by means of an image forming apparatus used in the present invention will be described with reference to FIG. 3. An image forming apparatus 100 shown in FIG. 3 has the same configuration as that of the image forming apparatus 100 shown in FIG. 2, except that no developing belt 41 in the image forming apparatus 100 shown in FIG. 3 is provided and a black development unit 45K, a yellow development unit 45Y, a magenta development unit 45M, and a cyan development unit 45C are arranged around the photoconductor 10 in a directly opposing manner, and exhibits the same actions and effects. In FIG. 3, the same components as those in FIG. 2 are denoted with the same reference numerals.

Figure 4:
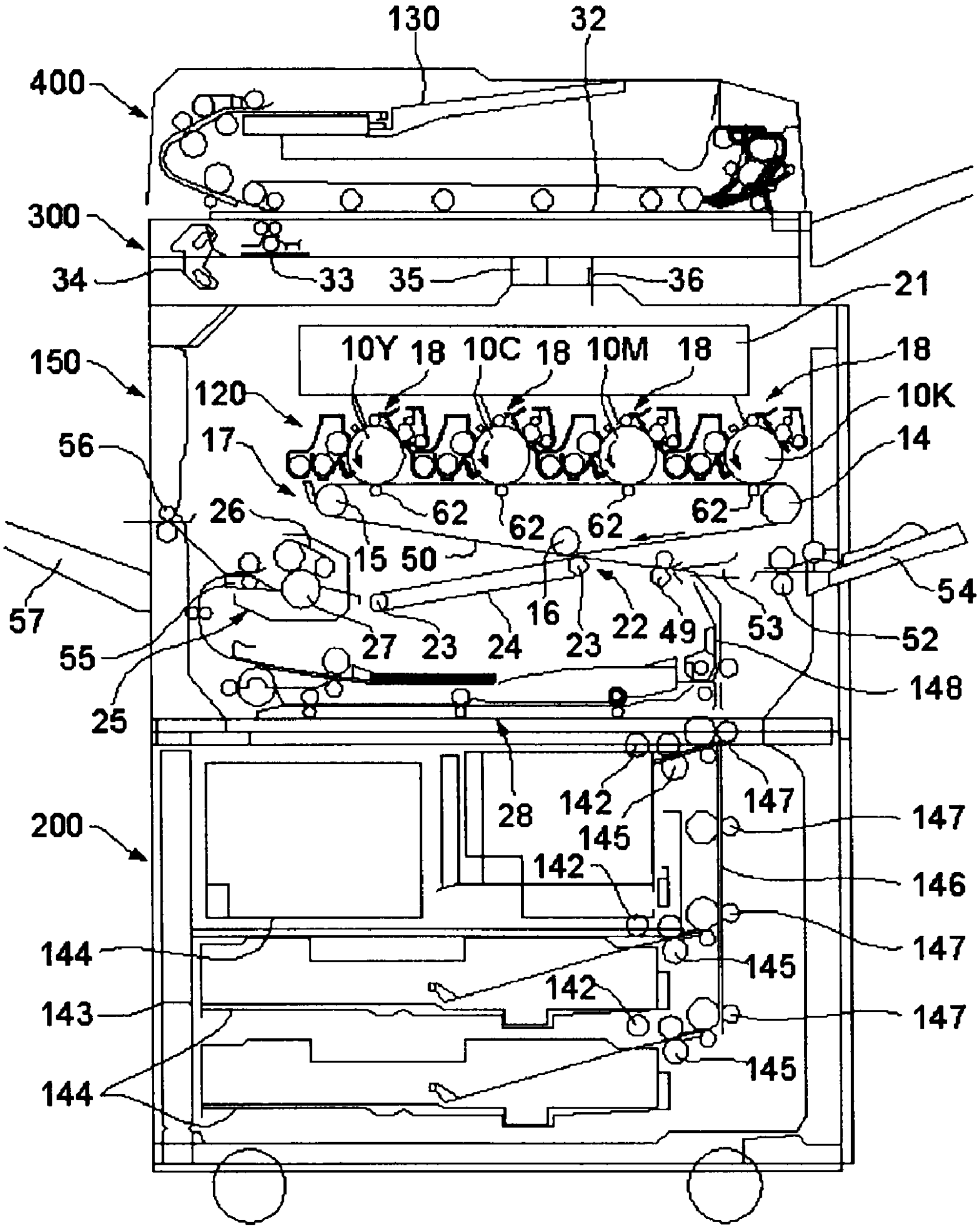
FIG. 4 shows a schematic configuration of still another example of an image forming apparatus used in the present invention.

Another aspect for carrying out the image forming method in the present invention by means of an image forming apparatus used in the present invention will be described with reference to FIG. 4. A tandem image forming apparatus shown in FIG. 4 is a tandem color image forming apparatus. The tandem image forming apparatus includes a copier body 150, a paper feed table 200, a scanner 300, and an automatic document feeder (ADF) 400.

In the copier body 150, an endless belt-like intermediate transfer medium 50 is provided at the center portion. The intermediate transfer medium 50 is stretched around support rollers 14, 15, and 16 and is made rotatable clockwise in FIG. 4. In the vicinity of the support roller 15, arranged is a cleaning device 17 for removing a residual toner on the intermediate transfer medium 50. On the intermediate transfer medium 50 stretched by the support roller 14 and the support roller 15, arranged along its conveying direction is a tandem developing device 120 for which four yellow, cyan, magenta, and black image forming units 18 are juxtaposed in an opposing manner. In the vicinity of the tandem developing device 120, arranged is an exposure 21. On the side opposite to the side where the tandem developing device 120 is arranged in the intermediate transfer medium 50, a secondary transferring device 22 is arranged. In the secondary transferring device 22, a secondary transfer belt 24 serving as an endless belt is stretched across a pair of rollers 23, and a transfer sheet and the intermediate transfer medium 50 conveyed on the secondary transfer belt 24 can contact each other. In the vicinity of the secondary transferring device 22, arranged is a fixing device 25. The fixing device 25 includes a fixing belt 26 serving as an endless belt and a pressure roller 27 arranged while being pressed thereagainst.

Here, in the tandem image forming apparatus, arranged in the vicinity of the secondary transfer device 22 and the fixing device 25 is a sheet reversing device 28 for reversing the transfer sheet in order to form images on both surfaces of the transfer sheet.

Next, formation of a full-color image (color copy) using the tandem developing device 120 will be described. That is, first, a document is set on a document table 130 of the automatic document feeder (ADF) 400, or the automatic document feeder 400 is opened and a document is set on a contact glass 32 of the scanner 300, and then the automatic document feeder 400 is closed.

When the document has been set on the automatic document feeder 400, the scanner 300 is driven after the document is conveyed and moved onto the contact glass 32; on the other hand, when the document has been set on the contact glass 32, the scanner 300 is immediately driven, upon pressing a start switch (not shown), and a first traveler 33 and a second traveler 34 travel. At this time, by the first traveler 33, light from a light source is irradiated while a reflected light from the document surface is reflected by a mirror of the second traveler 34, the light is received by a reading sensor 36 through an imaging lens 35, and thus the color document (color image) is read as black, yellow, magenta, and cyan image information.

Figure 5:
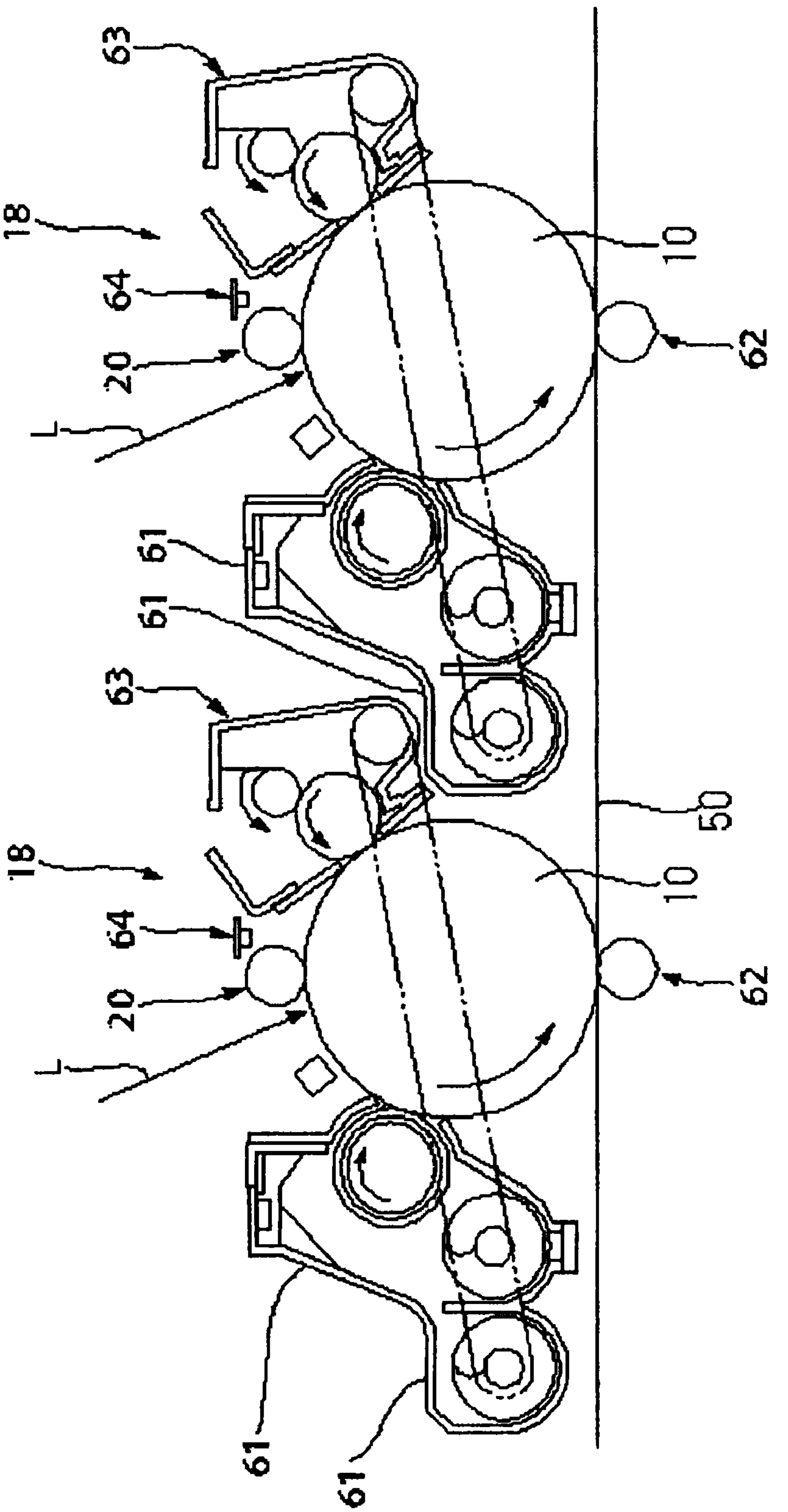
FIG. 5 shows a schematic configuration of further still another example of an image forming apparatus used in the present invention.

Then, the respective black, yellow, magenta, and cyan image information are transmitted to the respective image forming units 18 (black image forming unit, yellow image forming unit, magenta image forming unit, and cyan image forming unit) of the tandem developing device 120, respectively, and black, yellow, magenta, and cyan toner images are formed by the respective image forming units. That is, the respective image forming units 18 (black image forming unit, yellow image forming unit, magenta image forming unit, and cyan image forming unit) of the tandem developing device 120 include, as shown in FIG. 5, photoconductors 10 (black photoconductor 10K, yellow photoconductor 10Y, magenta photoconductor 10M, and cyan photoconductor 10C), chargers 20 that uniformly charge the photoconductors, exposurers that expose ("L" in FIG. 5) the photoconductors imagewise corresponding to respective color images based on the respective color image information and thereby form latent electrostatic images corresponding to the respective color images on the photoconductors, developing devices 61 that develop the latent electrostatic images with respective color toners (black toner, yellow toner, magenta toner, and cyan toner) to form toner images of the respective color toners, transfer chargers 62 that transfer the toner images onto the intermediate transfer medium 50, photoconductor cleaning devices 63, and charge eliminating devices 64, respectively, and are capable of forming the respective single-color images (black image, yellow image, magenta image, and cyan image) based on the respective color image information. For the thus formed black image, yellow image, magenta image, and cyan image, the black image formed on the black photoconductor 10K, the yellow image formed on the yellow photoconductor 10Y, the magenta image formed on the magenta photoconductor 10M, and the cyan image formed on the cyan photoconductor 10C are respectively transferred (primary transfer) in sequence onto the intermediate transfer medium 50 rotationally moved by the support rollers 14, 15, and 16. Then, the black image, the yellow image, the magenta image, and the cyan image are superimposed on the intermediate transfer medium 50 to form a composite color image (color transfer image).

On the other hand, in the paper feed table 200, one of the paper feed rollers 142 is selectively rotated to let sheets (recording paper) out from one of the paper feed cassettes 144 provided in multiple tiers in a paper bank 143, and the sheets are separated by a separation roller 145 and separately sent out to a paper feed path 146, are conveyed by a conveyance roller 147 and guided to a paper feed path 148 within the copier body 150, and are made to hit against a resist roller 49 and stopped. Alternatively, the paper feed roller 142 is rotated to let sheets (recording paper) on a manual feed tray 54, and the sheets are separated by the separation roller 52 and separately fed into a manual paper feed path 53, and are similarly made to hit against the resist roller 49 and stopped. Here, the resist roller 49 is generally used grounded, but it may be used in a state where a bias is applied for removing paper powder of the sheets.

Then, the resist roller 49 is rotated in timing with the composite color image (color transfer image) formed on the intermediate transfer medium 50 to send out the sheet (recording paper) between the intermediate transfer medium 50 and the secondary transferring unit 22, and the composite color image (color transfer image) is transferred (secondary transfer) onto the sheet (recording paper) by means of the secondary transferring unit 22 so as to form a color image on the sheet (recording paper). The residual toner on the intermediate transfer medium 50 after image is transferred is cleaned by the cleaning device 17 for the intermediate transfer medium.

The sheet (recording paper) on which a color image is transferred and formed is conveyed by the secondary transferring device 22 and sent out to the fixing device 25, and in the fixing device 25, the composite color image (color transfer image) is fixed onto the sheet (recording paper) by heat and pressure. Then, the sheet (recording paper) is switched by a switching claw 55, is discharged by a discharge roller 56, and is stacked on a discharged paper tray 57, or the sheet (recording paper) is switched by the switching claw 55, is reversed by the sheet reversing device 28, is guided again to the transfer position for recording an image on the rear surface as well, and then is discharged by the discharge roller 56 and is stacked on the discharged paper tray 57.

In the image forming apparatus and image forming method used in the present invention, the toner of the present invention having excellent charge ability and surface property and the like, is used, thereby efficiently obtaining high image quality.

EXAMPLES

Hereinafter, Examples of the present invention will be explained, which should not be construed to limit the present invention. All part(s) are expressed by mass unless indicated otherwise.

Synthesis Example 1

-Synthesis of Surfactant 1-

A pressure-resistant reaction cell was charged with 1,000 parts of 1H,1H-perfluorooctylacrylate (manufactured by AZmax. co), and 10 parts of 2,2'-azobisisobutyronitrile (also referred to as AIBN, manufactured by Wako Pure Chemical Industries, Ltd.) (50 volume % of the pressure-resistant reaction cell). Carbon dioxide was selected as a supercritical fluid and the pressure-resistant reaction cell was supplied therewith. The cell pressure was controlled at 30 MPa using a pressure pump, and the cell temperature was controlled at 65° C. using a temperature controller, allowing a reaction to take place for 24 hours. After termination of the reaction, the pressure-resistant reaction cell was cooled to a temperature of 0° C. and brought to normal pressure using a back pressure valve to obtain Surfactant 1. The weight average molecular weight (Mw) of the obtained Surfactant 1 was 98,000 as measured by gel permeation chromatography (GPC).

Synthesis Example 2

-Synthesis of Surfactant 2-

A pressure-resistant reaction cell was charged with 500 parts of 1H,1H-perfluorooctylmethacrylate (manufactured by AZmax.co), 500 parts of a styrene monomer, and 5 parts of 2,2'-azobisisobutyronitrile (AIBN, manufactured by Wako Pure Chemical Industries, Ltd.) (40 volume % of the pressure-resistant reaction cell). Carbon dioxide was selected as a supercritical fluid and the pressure-resistant reaction cell was supplied therewith using a supply cylinder. The cell pressure was controlled at 20 MPa using a pressure pump, and the cell temperature was controlled at 65° C. using a temperature controller, allowing a reaction to take place for 48 hours. After termination of the reaction, the pressure-resistant reaction cell was cooled to a temperature of 0° C. and brought to normal pressure using a back pressure valve to obtain Surfactant 2. The weight average molecular weight (Mw) of the obtained Surfactant 2 was 85,000 as measured by gel permeation chromatography (GPC).

Synthesis Example 3

-Synthesis of Surfactant 3-

A pressure-resistant reaction cell was charged with 1,000 parts of 2-(perfluorodecyl)ethyl acrylate (manufactured by AZmax.co), and 1 part of V-65 (2,2'-azobis(2,4-dimethylvaleronitrile), manufactured by Wako Pure Chemical Industries, Ltd.) (30 volume % of the pressure-resistant reaction cell). Carbon dioxide was selected as a supercritical fluid and the pressure-resistant reaction cell was supplied therewith using a supply cylinder. The cell pressure was controlled at 35 MPa using a pressure pump, and the cell temperature was controlled at 50° C. using a temperature controller, allowing a reaction to take place for 24 hours. After termination of the reaction, the pressure-resistant reaction cell was cooled to a temperature of 0° C. and brought to normal pressure using a back pressure valve to obtain Surfactant 3. The weight average molecular weight (Mw) of the obtained Surfactant 3 was 152,000 as measured by gel permeation chromatography (GPC).

Synthesis Example 4

-Synthesis of Surfactant 4- (Example of Bulk Polymerization)

A glass ampoule for freezing equipped with a stirring bar was charged with 100 parts of 2-(perfluorooctyl)ethyl acrylate and 0.2 parts of 2,2'-azobisisobutyronitrile (AIBN manufactured by Wako Pure Chemical Industries, Ltd.) during deaeration of the ampoule with a vacuum pump, (1) freezed using Dewar vessel containing liquid nitrogen, and then (2) thawed at room temperature. The operation from (1) to (2) was repeated approximately 20 times. After deaerating the ampoule, the upper portion of the ampoule was closed by heat-melting with a burner. The ampoule was placed in an oil bath at 120° C., allowing a reaction to take place for 72 hours while stirring the inside of the ampoule. After the reaction was terminated, the ampoule was cooled down to the room temperature. The upper portion of the ampoule was cut out and 500 parts of hexafluorobenzene was added therein to dissolve a reactant. This was dropped down to 10,000 parts of methanol, and then subjected to reprecipitation purification. Subsequently, the reprecipitation purification was repeated 3 times to obtain a white Surfactant 4 (yield 98%). The weight average molecular weight (Mw) of the Surfactant 4 was 2,500,000 as measured by GPC.

Synthesis Example 5

-Synthesis of Surfactant 5-(Example of Living Radical Polymerization)

A glass ampoule for freezing equipped with a stirring bar was charged with 300 parts of 2-(perfluorooctyl)ethyl acrylate, 18 parts of 4-methoxy-2,2,6,6-tetramethylpiperidine 1-oxyl, and 10 parts of 2,2'-azobisisobutyronitrile (AIBN manufactured by Wako Pure Chemical Industries, Ltd.) during deaeration of the ampoule with a vacuum pump, (1) freezed using Dewar vessel containing liquid nitrogen, and then (2) thawed at temperature. The operation from (1) to (2) was repeated approximately 20 times. After deaerating the ampoule, the upper portion of the ampoule was closed by heat-melting with a burner. The ampoule was placed in an oil bath at 90° C. and then the bath temperature was increased to 155° C. over 30 minutes, allowing a reaction to take place for 96 hours while stirring the inside of the ampoule.

After the reaction was terminated, the ampoule was cooled down to the room temperature. The upper portion of the ampoule was cut out and 500 parts of hexafluorobenzene was added therein to dissolve a reactant. This was dropped down to 10,000 parts of methanol, and then subjected to reprecipitation purification. Subsequently, the reprecipitation purification was repeated 3 times to obtain a white Surfactant 5 (yield 97%). The weight average molecular weight (Mw) of the Surfactant 5 was 95,000 as measured by GPC.

Example 1

-Preparation of Polymerizable Monomer Composition-

In a vessel 50 parts of C. I. Pigment Yellow PY 180 (manufactured by Clariant), a polymerizable monomer consisting of 800 parts of styrene, 200 parts of n-butyl acrylate and 5 parts of ethylene glycol dimethacrylate 50 parts of Surfactant 1, 50 parts of a silicone wax (AMS-C30 manufactured by Dow Corning Toray Co., Ltd.), and 10,000 parts of 3 mm-YTZ zirconia beads were loaded, and then uniformly dispersed by a paint shaker (manufactured by SEIWA GIKEN Co., Ltd.) for 4 hours to prepare Polymerizable Monomer Composition 1.

<Supercritical Polymerization Step>

A pressure-resistant reaction cell was charged with 150 parts of Polymerizable Monomer Composition 1 (30 volume % of the pressure-resistant reaction cell). Carbon dioxide was selected as a supercritical fluid and the pressure-resistant reaction cell was supplied therewith using a supply cylinder. The cell pressure was controlled at 30 MPa using a pressure pump, and the cell temperature was controlled at 65° C. using a temperature controller. Then, the cell was further charged with 1.5 parts of 2,2'-azobisisobutyronitrile (AIBN, manufactured by Wako Pure Chemical Industries, Ltd.) as a polymerization initiator to obtain a pigment dispersion, and then the polymerizable monomer was subjected to a polymerization reaction for 40 hours.

After termination of the reaction, the pressure-resistant reaction cell was cooled to a temperature of 5° C. and then brought to normal pressure using a back pressure valve to obtain Colored Polymer Particles 1 (yield 98%). Colored Polymer Particles 1 had a weight average particle diameter (D4) of 5.3 μm and a number average particle diameter (Dn) of 5.0 μm, the (D4)/(Dn) being 1.06 by means of the particle size distribution measurement using a COULTER MULTISIZER II (100 μm-aperture tube).

Example 2

-Preparation of Polymerizable Monomer Composition-

In a vessel 100 parts of C. I. Pigment Red PR269 (manufactured by DIC Corporation), 493 parts of styrene, 403 parts of methyl acrylate, 4 parts of divinylbenzene, 10 parts of Surfactant 2, and 10,000 parts of 3 mm-YTZ zirconia beads were loaded, and then uniformly dispersed by a paint shaker (manufactured by SEIWA GIKEN Co., Ltd.) for 4 hours to prepare Polymerizable Monomer Composition 2.

<Supercritical Polymerization Step>

A pressure-resistant reaction cell was charged with 100 parts of Polymerizable Monomer Composition 2 (20 volume % of the pressure-resistant reaction cell). Carbon dioxide was selected as a supercritical fluid and the pressure-resistant reaction cell was supplied therewith using a supply cylinder. The cell pressure was controlled at 20 MPa using a pressure pump, and the cell temperature was controlled at 85° C. using a temperature controller. Then, the cell was further charged with 1 part of 2,2'-azobisisobutyronitrile (AIBN, manufactured by Wako Pure Chemical Industries, Ltd.) as a polymerization initiator to obtain a pigment dispersion, and then the polymerizable monomer was subjected to a polymerization reaction for 40 hours.

After termination of the reaction, the pressure-resistant reaction cell was cooled to a temperature of 5° C., and then carbon dioxide was flowed for over 30 minutes to remove monomers left over by adjusting a flow rate of an outlet side of a back pressure valve to 5.0 L/min using the back pressure valve. Thereafter, the reaction cell was gradually brought to normal temperature and pressure to obtain Colored Polymer Particles 2 (yield 97%). Colored Polymer Particles 2 had a weight average particle diameter (D4) of 6.4 μm and a number average particle diameter (Dn) of 6.0 μm, the (D4)/(Dn) being 1.07 by means of the particle size distribution measurement using a COULTER MULTISIZER II (100 μm-aperture tube).

Example 3

-Preparation of Polymerizable Monomer Composition-

In a vessel 50 parts of Pigment Blue PB15:3 (manufactured by Dainichiseika Color & Chemicals Mfg. Co., Ltd.), a polymerizable monomer consisting of 800 parts of styrene, 200 parts of n-butyl acrylate and 5 parts of ethylene glycol dimethacrylate, 100 parts of Surfactant 3, parts of pentaerythritol tetrastearate (stearic acid: approximately 60% purity), 20 parts of natural gas based Fischer-Tropsch wax (FT&#8722, manufactured by D shell•MS, melting point 92° C.), and 10,000 parts of 3 mm-YTZ zirconia beads were loaded, and then uniformly dispersed by a batch type sand mill (manufactured by Kanpe Hapio Co., Ltd.) for 4 hours to prepare Polymerizable Monomer Composition 3.

<Supercritical Polymerization Step>

A pressure-resistant reaction cell was charged with 150 parts of Polymerizable Monomer Composition 3 and 25 parts of V-65 (2,2'-azobis(2,4-dimethylvaleronitrile), manufactured by Wako Pure Chemical Industries, Ltd.) as a polymerization initiator (30 volume % of the pressure-resistant reaction cell). Carbon dioxide was selected as a supercritical fluid and the pressure-resistant reaction cell was supplied therewith using a supply cylinder to obtain a pigment dispersion. The cell pressure was controlled at 15 MPa using a pressure pump, and the cell temperature was controlled at 50° C. using a temperature controller, allowing a polymerization reaction to take place for 40 hours.

After termination of the reaction, the pressure-resistant reaction cell was cooled to a temperature of 5° C., and then carbon dioxide was flowed for over 30 minutes to remove monomers left over by adjusting a flow rate of an outlet side of a back pressure valve to 5.0 L/min using the back pressure valve. Thereafter, the reaction cell was gradually brought to normal temperature and pressure to obtain Colored Polymer Particles 3 (yield 97%). Colored Polymer Particles 3 had a weight average particle diameter (D4) of 7.2 μm and a number average particle diameter (Dn) of 6.8 μm, the (D4)/(Dn) being 1.06 by means of the particle size distribution measurement using a COULTER MULTISIZER II (100 μm-aperture tube).

Example 4

-Preparation of Polymerizable Monomer Composition-

In a vessel 30 parts of carbon black (PRINTEX35, manufactured by Degussa), a polymerizable monomer consisting of 900 parts of styrene and 5 parts of ethylene glycol dimethacrylate, 50 parts of Surfactant 4, and 65 parts of synthesized ester wax (WEP-5 manufactured by NOF CORPORATION) were loaded, and then the mixture was dispersed by a bead mill (ULTRAVISCOMILL manufactured by Aimex Co., Ltd.) which was filled with 80 volume % of 0.5 mm-zirconia beads, under the conditions of a liquid feeding speed of 1 kg/hr, a disk circumferential speed of 6 m/s, and 3 times-pass through, to prepare Polymerizable Monomer Composition 4.

<Supercritical Polymerization Step>

A pressure-resistant reaction cell was charged with 100 parts of Polymerizable Monomer Composition 4 and 1 part of 2,2'-azobisisobutyronitrile (AIBN, manufactured by Wako Pure Chemical Industries, Ltd.) as a polymerization initiator (20 volume % of the pressure-resistant reaction cell). Carbon dioxide was selected as a supercritical fluid and the pressure-resistant reaction cell was supplied therewith using a supply cylinder to obtain a pigment dispersion. The cell pressure was controlled at 35 MPa using a pressure pump, and the cell temperature was controlled at 50° C. using a temperature controller, allowing a polymerization reaction to take place for 40 hours.

After termination of the reaction, the pressure-resistant reaction cell was cooled to a temperature of 5° C., and then carbon dioxide was flowed for over 30 minutes to remove monomers left over by adjusting a flow rate of an outlet side of a back pressure valve to 5.0 L/min using the back pressure valve. Thereafter, the reaction cell was gradually brought to normal temperature and pressure to obtain Colored Polymer Particles 4 (yield 99%). Colored Polymer Particles 4 had a weight average particle diameter (D4) of 4.3 μm and a number average particle diameter (Dn) of 4.0 μm, the (D4)/(Dn) being 1.08 by means of the particle size distribution measurement using a COULTER MULTISIZER II (100 μm-aperture tube).

Example 5

-Preparation of Polymerizable Monomer Composition-

Forty eight (48) parts of carbon black (REGAL400R manufactured by Cabot), a polymerizable monomer consisting of 12 parts of Pigment Blue PB 15:3 (manufactured by Dainichiseika Color & Chemicals Mfg. Co., Ltd.), 800 parts of styrene, 200 parts of n-butyl acrylate and 3 parts of ethylene glycol dimethacrylate, 5 parts of Surfactant 5, and 50 parts of a carnauba wax (CWT01 manufactured by Toyo Petrolite Co. Ltd.) were uniformly dispersed by a paint shaker (manufactured by SEIWA GIKEN Co., Ltd.) for 4 hours to prepare Polymerizable Monomer Composition 5.

<Supercritical Polymerization Step>

A pressure-resistant reaction cell was charged with 250 parts of Polymerizable Monomer Composition 5 (50 volume % of the pressure-resistant reaction cell). Carbon dioxide was selected as a supercritical fluid and the pressure-resistant reaction cell was supplied therewith using a supply cylinder. The cell pressure was controlled at 30 MPa using a pressure pump, and the cell temperature was controlled at 65° C. using a temperature controller. The pressure-resistant reaction cell was further charged with 2.5 parts of 2,2'-azobisisobutyronitrile (AIBN, manufactured by Wako Pure Chemical Industries, Ltd.) as a polymerization initiator to obtain a pigment dispersion, and then the polymerizable monomer was subjected to a polymerization reaction for 24 hours.

After termination of the reaction, the pressure-resistant reaction cell was cooled to a temperature of 5° C., and then carbon dioxide was flowed for over 30 minutes to remove monomers left over by adjusting a flow rate of an outlet side of a back pressure valve to 5.0 L/min using the back pressure valve. Thereafter, the reaction cell was gradually brought to normal temperature and pressure to obtain Colored Polymer Particles 5 (yield 97%). Colored Polymer Particles 5 had a weight average particle diameter (D4) of 6.2 μm and a number average particle diameter (Dn) of 5.8 μm, the (D4)/(Dn) being 1.07 by means of the particle size distribution measurement using a COULTER MULTISIZER II (100 μm-aperture tube).

Examples 6 to 15

Colored Polymer Particles 6 to 15 were respectively obtained in the same manner as in Example 1, except that the pigment used in Example 1 was changed to pigments shown in Table 1. The results are shown in Table 1.

Example 16

-Preparation of Polymerizable Monomer Composition-

In a vessel 50 parts of C. I. Pigment Yellow PY 180 (manufactured by Clariant), 10 parts of a basic pigment dispersant AJISPER PB821 (amine value: 10, acid value: 18 mgKOH/g, manufactured by Ajinomoto Fine-Techno Co., Inc.), a polymerizable monomer consisting of 800 parts of styrene, 200 parts of n-butyl acrylate and 5 parts of ethylene glycol dimethacrylate, 50 parts of Surfactant 1, 50 parts of a silicone wax (AMS-C30 manufactured by Dow Corning Toray Co., Ltd.), and 10,000 parts of 3 mm-YTZ zirconia beads were loaded, and then uniformly dispersed by a paint shaker (manufactured by SEIWA GIKEN Co., Ltd.) for 4 hours to prepare Polymerizable Monomer Composition 6.

<Supercritical Polymerization Step>

A pressure-resistant reaction cell was charged with 150 parts of Polymerizable Monomer Composition 6 (30 volume % of the pressure-resistant reaction cell). Carbon dioxide was selected as a supercritical fluid and the pressure-resistant reaction cell was supplied therewith using a supply cylinder. The cell pressure was controlled at 30 MPa using a pressure pump, and the cell temperature was controlled at 65° C. using a temperature controller. Then the cell was further charged with 1.5 parts of 2,2'-azobisisobutyronitrile (AIBN, manufactured by Wako Pure Chemical Industries, Ltd.) as a polymerization initiator to obtain a pigment dispersion, and then the polymerizable monomer was subjected to a polymerization reaction for 40 hours.

After termination of the reaction, the pressure-resistant reaction cell was cooled to a temperature of 5° C. and then brought to normal pressure using a back pressure valve to obtain Colored Polymer Particles 16 (yield 95%). Colored Polymer Particles 16 had a weight average particle diameter (D4) of 5.8 μm and a number average particle diameter (Dn) of 5.7 μm, the (D4)/(Dn) being 1.02 by means of the particle size distribution measurement using a COULTER MULTISIZER II (100 μm-aperture tube).

Examples 17 to 18

Colored Polymer Particles 17 and 18 were respectively obtained in the same manner as in Example 16, except that the pigment and pigment dispersion in Example 16 were changed to those shown in Table 1.

Example 19

-Preparation of Polymerizable Monomer Composition-

In a vessel 50 parts of C. I. Pigment Yellow PY 180 (manufactured by Clariant), 10 parts of a pigment dispersant AJISPER PB821 (amine value: 10, acid value:18 mgKOH/g, manufactured by Ajinomoto Fine-Techno Co., Inc.), 2.5 parts of a pigment dispersant SOLSPERSE 22000 (manufactured by Avecia), a polymerizable monomer consisting of 800 parts of styrene, 200 parts of n-butyl acrylate and 5 parts of ethylene glycol dimethacrylate, 50 parts of Surfactant 1, 50 parts of a silicone wax (AMS-C30 manufactured by Dow Corning Toray Co., Ltd.), and 10,000 parts of 3 mm-YTZ zirconia beads were loaded, and then uniformly dispersed by a paint shaker (manufactured by SEIWA GIKEN Co., Ltd.) for 4 hours to prepare Polymerizable Monomer Composition 7.

<Supercritical Polymerization Step>

A pressure-resistant reaction cell was charged with 150 parts of Polymerizable Monomer Composition 7 (30 volume % of the pressure-resistant reaction cell). Carbon dioxide was selected as a supercritical fluid and the pressure-resistant reaction cell was supplied therewith using a supply cylinder. The cell pressure was controlled at 30 MPa using a pressure pump, and the cell temperature was controlled at 65° C. using a temperature controller. Then the cell was further charged with 1.5 parts of 2,2'-azobisisobutyronitrile (AIBN, manufactured by Wako Pure Chemical Industries, Ltd.) as a polymerization initiator to obtain a pigment dispersion, and then the polymerizable monomer was subjected to a polymerization reaction for 40 hours.

After termination of the reaction, the pressure-resistant reaction cell was cooled to a temperature of 5° C. and then brought to normal pressure using a back pressure valve to obtain Colored Polymer Particles 19 (yield 95%). Colored Polymer Particles 19 had a weight average particle diameter (D4) of 5.5 μm and a number average particle diameter (Dn) of 5.4 μm, the (D4)/(Dn) being 1.02 by means of the particle size distribution measurement using a COULTER MULTISIZER II (100 μm-aperture tube).

Example 20

<Synthesis of Colorant (Polymer Dye) Obtained by the Reaction of Polymer with Basic Dye>

An inside of a 1 L four-necked flask equipped with a stirrer, a condenser, a thermometer and a nitrogen gas introducing tube was sufficiently purged with nitrogen gas, then charged with 25 g of distilled water, and heated to 90° C. over oil bath. A monomer aqueous solution in which 125 g of sodium p-styrenesulfonate was dissolved in 360 g of distilled water, and a polymerization initiator aqueous solution in which 2 g of ammonium persulfate was dissolved in 15 g of distilled water, were respectively dropped by dropping funnels for 3 hours in the flask. After dropping, the mixed solution was polymerized for two hours and cooled to a room temperature. The obtained polymer aqueous solution was poured in methanol and a polymerized product was precipitated and purified. Fifty (50) g of the obtained resin and 18 g of carotene yellow GLH (C. I. Basic Yellow 14, manufactured by Hodogaya Chemical Co., Ltd.) were dissolved in 500 g of water, and 5 g of 50% acetic acid aqueous solution was added therein and stirred at 60° C. for 1 hour. A precipitate was filtrated out, purified and dried to obtain Polymer Dye 1.

<Preparation of Polymerizable Monomer Composition>

In a vessel 35 parts of Polymer Dye 1, a polymerizable monomer consisting of 744 parts of styrene, 186 parts of n-butyl acrylate and 5 parts of ethylene glycol dimethacrylate, 50 parts of a silicone wax (AMS-C30 manufactured by Dow Corning Toray Co., Ltd.), and 10,000 parts of 3 mm-YTZ zirconia beads were loaded, and then uniformly dispersed by a paint shaker (manufactured by SEIWA GIKEN Co., Ltd.) for 4 hours. Then, 50 parts of Surfactant 1 and 30 parts of 2,2'-azobisisobutyronitrile (AIBN, manufactured by Wako Pure Chemical Industries, Ltd.) as a polymerization initiator was further added and stirred so as to be uniformly dispersed thereby to prepare Polymerizable Monomer Composition 8.

<Supercritical Polymerization Step>

A pressure-resistant reaction cell equipped with a stirrer was charged with 150 parts of Polymerizable Monomer Composition 8 (30 volume % of the pressure-resistant reaction cell). Carbon dioxide was selected as a supercritical fluid and the pressure-resistant reaction cell was supplied therewith using a supply cylinder. The cell pressure was controlled at 30 MPa using a pressure pump, and the cell temperature was controlled at 65° C. using a temperature controller while stirring, allowing a reaction to take place for 40 hours. After termination of the reaction, the pressure-resistant reaction cell was cooled to a temperature of 5° C. and then gradually brought to normal pressure using a back pressure valve to obtain yellow Colored Polymer Particles 20 (yield 97%). Colored Polymer Particles 20 had a weight average particle diameter (D4) of 5.8 μm and a number average particle diameter (Dn) of 5.3 μm, the (D4)/(Dn) being 1.09 by means of the particle size distribution measurement using a COULTER MULTISIZER II (100 μm-aperture tube). The Colored Polymer Particles 20 had a number average molecular weight (Mn) of 7,550 and a molecular weight distribution (Mw/Mn) of 2.23.

Example 21

<Production of Polymer Dye 2>

After Polymer Dye 1 was toluene-extracted, the solvent was removed to obtain Polymer Dye 2 consisting of a toluene soluble component.

<Preparation of Polymerizable Monomer Composition>

By a paint shaker (manufactured by SEIWA GIKEN Co., Ltd.), 60 parts of Polymer Dye 2 was dissolved in a polymerizable monomer consisting of 744 parts of styrene, 186 parts of n-butyl acrylate and 5 parts of ethylene glycol dimethacrylate, and then 50 parts of a silicone wax (AMS-C30 manufactured by Dow Corning Toray Co., Ltd.) and 10,000 parts of 3 mm-YTZ zirconia beads were added and uniformly dispersed for 4 hours. Then, 50 parts of Surfactant 1 and 30 parts of 2,2'-azobisisobutyronitrile (AIBN, manufactured by Wako Pure Chemical Industries, Ltd.) as a polymerization initiator was further added and stirred so as to be uniformly dispersed thereby to prepare Polymerizable Monomer Composition 9.

<Supercritical Polymerization Step>

A pressure-resistant reaction cell equipped with a stirrer was charged with 150 parts of Polymerizable Monomer Composition 9 (30 volume % of the pressure-resistant reaction cell). Carbon dioxide was selected as a supercritical fluid and the pressure-resistant reaction cell was supplied therewith using a supply cylinder. The cell pressure was controlled at 30 MPa using a pressure pump, and the cell temperature was controlled at 65° C. using a temperature controller while stirring, allowing a reaction to take place for 40 hours. After termination of the reaction, the pressure-resistant reaction cell was cooled to a temperature of 5° C. and then gradually brought to normal pressure using a back pressure valve to obtain yellow Colored Polymer Particles 21 (yield 97%). Colored Polymer Particles 21 had a weight average particle diameter (D4) of 5.0 μm and a number average particle diameter (Dn) of 4.8 μm, the (D4)/(Dn) being 1.04 by means of the particle size distribution measurement using a COULTER MULTISIZER II (100 μm-aperture tube). The Colored Polymer Particles 21 had a number average molecular weight (Mn) of 8,120 and molecular weight distribution (Mw/Mn) of 2.31.

Comparative Example 1

A hermetically-sealable reactor equipped with a blade stirrer, a cooling condenser and a nitrogen gas inlet tube was installed to a constant temperature water bath, and the reactor was charged with the following compositions:

| | |
|---|---|
| Ethanol | 70 parts |
| Distilled water | 30 parts |
| Polyvinylpyrrolidone | 4 parts |

Subsequently, the blade stirrer was rotated for complete dissolution of polyvinylpyrrolidone.

Next, 40 parts of the Polymerizable Monomer Composition 6 was charged in the reactor, and 0.03 parts of carbon tetrachloride and 0.6 parts of benzoyl peroxide were added therein.

While rotating the blade stirrer, nitrogen gas was introduced in the vessel to purge oxygen completely. The water bath was then heated to 50±0.1° C. to start polymerization reaction. Two hours later, the water bath was heated to 65±0.1° C. to increase the reaction rate.

After 40 hours from the start of the polymerization reaction, the water bath was cooled to room temperature to prepare a dispersion liquid. An aliquot of the dispersion was subjected to gas chromatography using an internal standard method, yielding the polymerization degree of 90%. The dispersion liquid was washed with ethanol, and subjected to centrifugal sedimentation, and the supernatant liquid was removed, and then the dispersion liquid was dispersed in ethanol again. This process was repeated three times, and then the dispersion liquid was filtrated to obtain Comparative Colored Polymer Particles 1 (yield 90%). Comparative Colored Polymer Particles 1 had a weight average particle diameter (D4) of 8.3 μm and a number average particle diameter (Dn) of 6.7 μm, and the (D4)/(Dn) being 1.24 by means of the particle size distribution measurement using a COULTER COUNTER (100 μm-aperture tube).

Comparative Examples 2 to 3

Comparative Colored Polymer Particles 2 and 3 were respectively obtained in the same manner as in Comparative Example 1, except that the pigment and pigment dispersant in Comparative Example 1 was changed to those shown in Table 1.

TABLE 1

| | Colored Polymer Particles No. | Pigment | Pigment dispersant | Pigment dispersant | Weight average particle diameter (D4) | Number average particle diameter (Dn) | D4/Dn | Yield (%) |
|---|---|---|---|---|---|---|---|---|
| Example 1 | 1 | PY180 | None | None | 5.3 | 5.0 | 1.06 | 98 |
| Example 2 | 2 | PR269 | None | None | 6.4 | 6.0 | 1.07 | 97 |
| Example 3 | 3 | PB15:3 | None | None | 7.2 | 6.8 | 1.06 | 97 |
| Example 4 | 4 | Printex35 | None | None | 4.3 | 4.0 | 1.08 | 99 |

TABLE 1-continued

| | Colored Polymer Particles No. | Pigment | Pigment dispersant | Pigment dispersant | Weight average particle diameter (D4) | Number average particle diameter (Dn) | D4/Dn | Yield (%) |
|---|---|---|---|---|---|---|---|---|
| Example 5 | 5 | Regal 400R/ PB15:3 | None | None | 6.2 | 5.8 | 1.07 | 97 |
| Example 6 | 6 | PY93 | None | None | 4.9 | 4.5 | 1.09 | 98 |
| Example 7 | 7 | PY128 | None | None | 5.7 | 5.3 | 1.08 | 97 |
| Example 8 | 8 | PY155 | None | None | 7.5 | 7.0 | 1.07 | 98 |
| Example 9 | 9 | PY74 | None | None | 3.8 | 3.5 | 1.09 | 96 |
| Example 10 | 10 | PR122 | None | None | 6.8 | 6.3 | 1.08 | 98 |
| Example 11 | 11 | PR184 | None | None | 6.5 | 6.1 | 1.07 | 97 |
| Example 12 | 12 | PR57:1 | None | None | 5.1 | 4.7 | 1.09 | 98 |
| Example 13 | 13 | PR238 | None | None | 4.4 | 4.1 | 1.07 | 96 |
| Example 14 | 14 | PR146 | None | None | 5.9 | 5.5 | 1.07 | 97 |
| Example 15 | 15 | PR185 | None | None | 5.9 | 5.4 | 1.09 | 97 |
| Example 16 | 16 | PY180 | AJISPER PB821 | None | 5.8 | 5.7 | 1.02 | 95 |
| Example 17 | 17 | PR269 | EFKA-4080 | None | 6.7 | 6.5 | 1.03 | 94 |
| Example 18 | 18 | PB15:3 | AJISPER PB822 | None | 7.5 | 7.3 | 1.03 | 95 |
| Example 19 | 19 | PY180 | AJISPER PB821 | SOLSPERSE 22000 | 5.5 | 5.4 | 1.02 | 95 |
| Example 20 | 20 | Polymer dye 1 | None | None | 5.8 | 5.3 | 1.09 | 97 |
| Example 21 | 21 | Polymer dye 2 | None | None | 5.0 | 4.8 | 1.04 | 97 |
| Comparative Example 1 | Comparative Colored Polymer Particles 1 | PY180 | AJISPER PB821 | None | 8.3 | 6.7 | 1.24 | 90 |
| Comparative Example 2 | Comparative Colored Polymer Particles 2 | PR269 | BFKA-4080 | None | 9.2 | 7.2 | 1.28 | 90 |
| Comparative Example 3 | Comparative Colored Polymer Particles 3 | PB15:3 | AJISPER PB822 | None | 8.8 | 7.1 | 1.24 | 91 |

*) EFKA-4080(E*)EFKA-4080(EFKA Chemicals)

Example 22

-Preparation of Polymerizable Monomer Composition-

One (1) part of C. I. Disperse Red 60 (Plast Red 8375-N manufactured by ARIMOTO CHEMICAL CO., LTD.), 55 parts of styrene, 45 parts of methyl acrylate, 0.3 parts of divinylbenzene and 1 part of Surfactant 1 were stirred to prepare a uniform Polymerizable Monomer Composition 10 (mixed liquid).

<Supercritical Polymerization Step>

A pressure-resistant reaction cell was charged with 100 parts of Polymerizable Monomer Composition 10 (20 volume % of the pressure-resistant reaction cell). Carbon dioxide was selected as a supercritical fluid and the pressure-resistant reaction cell was supplied therewith using a supply cylinder. The cell pressure was controlled at 30 MPa using a pressure pump, and the cell temperature was controlled at 85° C. using a temperature controller. Then, the cell was further charged with 0.5 parts of 2,2'-azobisisobutyronitrile (AIBN, manufactured by Wako Pure Chemical Industries, Ltd.) as a polymerization initiator, allowing a reaction to take place for 40 hours.

After termination of the reaction, the pressure-resistant reaction cell was cooled to a temperature of 5° C. while keeping pressure, and then carbon dioxide was flowed for over 6 hours to remove monomers left over by adjusting a flow rate of an outlet side of a back pressure valve to 5.0 L/min using the pressure pump and the back pressure valve. Thereafter, the reaction cell was gradually brought to normal temperature and pressure to obtain Colored Polymer Particles 22 (yield 98%). Colored Polymer Particles 22 had a weight average particle diameter (D4) of 4.3 μm by means of the particle size distribution measurement using a COULTER MULTISIZER II (100 μm-aperture tube).

Example 23

-Preparation of Polymerizable Monomer Composition-

By a batch type sand mill (manufactured by Kanpe Hapio Co., Ltd.), 5 parts of C. I. Disperse Yellow 54 (Plast Yellow 8040 manufactured by ARIMOTO CHEMICAL CO., LTD.), a polymerizable monomer consisting of, 80 parts of styrene, 20 parts of butyl acrylate and 0.5 parts of ethylene glycol dimethacrylate, 5 parts of Surfactant 2, and 5 parts of a carnauba wax (CWT01 manufactured by Toyo Petrolite Co. Ltd.) were uniformly dispersed for 4 hours to prepare Polymerizable Monomer Composition 11.

<Supercritical Polymerization Step>

A pressure-resistant reaction cell was charged with 150 parts of Polymerizable Monomer Composition 11 (30 volume % of the pressure-resistant reaction cell). Carbon dioxide was selected as a supercritical fluid and the pressure-resistant reaction cell was supplied therewith using a supply cylinder. The cell pressure was controlled at 30 MPa using a pressure pump, and the cell temperature was controlled at 65° C. using a temperature controller. Then, the cell was further charged with 1.5 parts of 2,2'-azobisisobutyronitrile (AIBN, manufactured by Wako Pure Chemical Industries, Ltd.) as a polymerization initiator, allowing a reaction to take place for 40 hours.

After termination of the reaction, the pressure-resistant reaction cell was cooled to a temperature of 5° C. while keeping pressure, and then carbon dioxide was flowed for over 6 hours to remove monomers left over by adjusting a flow rate of an outlet side of a back pressure valve to 5.0 L/min using the pressure pump and the back pressure valve. Thereafter, the reaction cell was gradually brought to normal temperature and pressure to obtain Colored Polymer Particles 23 (yield 95%). Colored Polymer Particles 23 had a weight average particle diameter (D4) of 7.2 μm by means of the particle size distribution measurement using a COULTER MULTISIZER II (100 μm-aperture tube).

Example 24

-Preparation of Polymerizable Monomer Composition-

By a batch type sand mill (manufactured by Kanpe Hapio Co., Ltd.), 0.1 parts of C. I. Solvent Blue 35 (Oil Blue 5502 manufactured by ARIMOTO CHEMICAL CO., LTD.), a polymerizable monomer consisting of 800 parts of styrene, 200 parts of n-butyl acrylate and 5 parts of ethylene glycol dimethacrylate, 10 parts of Surfactant 3, 30 parts of pentaerythritol tetrastearate (stearic acid: approximately 60% purity), and 20 parts of natural gas based Fischer-Tropsch wax (FT&#8722, manufactured by D shell•MS, melting point of 92° C.) were uniformly dispersed for 4 hours to prepare Polymerizable Monomer Composition 12.

<Supercritical Polymerization Step>

A pressure-resistant reaction cell was charged with 250 parts of Polymerizable Monomer Composition 12 and 5 parts of V-65 (2,2'-azobis(2,4-dimethylvaleronitrile), manufactured by Wako Pure Chemical Industries, Ltd.) as a polymerization initiator (50 volume % of the pressure-resistant reaction cell). Carbon dioxide was selected as a supercritical fluid and the pressure-resistant reaction cell was supplied therewith using a supply cylinder. The cell pressure was controlled at 15 MPa using a pressure pump, and the cell temperature was controlled at 50° C. using a temperature controller, allowing a reaction to take place for 40 hours.

After termination of the reaction, the pressure-resistant reaction cell was cooled to a temperature of 5° C. while keeping pressure, and then carbon dioxide was flowed over 6 hours to remove monomers left over by adjusting a flow rate of an outlet side of a back pressure valve to 5.0 L/min using the pressure pump and the back pressure valve. Thereafter, the reaction cell was gradually brought to normal temperature and pressure to obtain Colored Polymer Particles 24 (yield 98%). Colored Polymer Particles 24 had a weight average particle diameter (D4) of 6.5 μm by means of the particle size distribution measurement using a COULTER MULTISIZER II (100 μm-aperture tube).

Example 25

-Preparation of Polymerizable Monomer Composition-

By a batch type sand mill (manufactured by Kanpe Hapio Co., Ltd.), 0.5 parts of Oil Black HBB (Orient Chemical Industries, Ltd.), 0.02 parts of Oil Orange 201 (Orient Chemical Industries, Ltd.), a polymerizable monomer consisting of 100 parts of styrene and 0.5 parts of divinylbenzene, 5 parts of Surfactant 1, and 5 parts of synthesized ester wax (WEP05 manufactured by NOF CORPORATION) were uniformly dispersed for 4 hours to prepare Polymerizable Monomer Composition 13.

<Supercritical Polymerization Step>

A pressure-resistant reaction cell was charged with 100 parts of Polymerizable Monomer Composition 13 and 1 part of 2,2'-azobisisobutyronitrile (AIBN, manufactured by Wako Pure Chemical Industries, Ltd.) as a polymerization initiator (20 volume % of the pressure-resistant reaction cell). Carbon dioxide was selected as a supercritical fluid and the pressure-resistant reaction cell was supplied therewith using a supply cylinder. The cell pressure was controlled at 35 MPa using a pressure pump, and the cell temperature was controlled at 50° C. using a temperature controller, allowing a reaction to take place for 40 hours.

After termination of the reaction, the pressure-resistant reaction cell was cooled to a temperature of 5° C. while keeping pressure, and then carbon dioxide was flowed for over 6 hours to remove monomers left over by adjusting a flow rate of an outlet side of a back pressure valve to 5.0 L/min using the pressure pump and the back pressure valve. Thereafter, the reaction cell was gradually brought to normal temperature and pressure to obtain Colored Polymer Particles 25 (yield 99%). Colored Polymer Particles 25 had a weight average particle diameter (D4) of 5.3 μm by means of the particle size distribution measurement using a COULTER MULTISIZER II (100 μm-aperture tube).

Example 26

Colored Polymer Particles 26 (yield 97%) was obtained in the same manner as in Example 23, except that the Surfactant 2 and carnauba wax used in Example 23 were respectively changed to Surfactant 4 and a silicone wax (AMS-C30 manufactured by Dow Corning Toray Co., Ltd.). Colored Polymer Particles 26 had a weight average particle diameter (D4) of 4.7 μm by means of the particle size distribution measurement using a COULTER MULTISIZER II (100 μm-aperture tube).

Example 27

Colored Polymer Particles 27 (yield 98%) was obtained in the same manner as in Example 23, except that the Surfactant 2 and carnauba wax used in Example 23 were respectively changed to Surfactant 5 and a silicone wax (AMS-C30 manufactured by Dow Corning Toray Co., Ltd.). Colored Polymer Particles 27 had a weight average particle diameter (D4) of 5.1 μm by means of the particle size distribution measurement using a COULTER MULTISIZER II (100 μm-aperture tube).

Comparative Example 4

A hermetically-sealable reactor equipped with a blade stirrer, a cooling condenser and a nitrogen gas inlet tube was installed to a constant temperature water bath, and the reactor was charged with the following compositions:

| | |
|---|---|
| Ethanol | 70 parts |
| Distilled water | 30 parts |
| Polyvinylpyrrolidone | 4 parts |

Subsequently, the blade stirrer was rotated for complete dissolution of polyvinylpyrrolidone. Next, the vessel was charged with the following compositions:

| | |
|---|---|
| Styrene | 28 parts |
| Ethyl acrylate | 10 parts |
| n-butyl methacrylate | 2 parts |
| Ethyleneglycol dimethacrylate | 0.2 parts |
| Carbon tetrachloride | 0.03 parts |
| Benzoyl peroxide | 0.6 parts |

While rotating the blade stirrer, nitrogen gas was introduced in the vessel to purge oxygen completely. The water bath was then heated to 50±0.1° C. to start polymerization reaction. Two hours later, the water bath was heated to 65±0.1° C. to increase the reaction rate.

After 12 hours from the start of the polymerization reaction, the water bath was cooled to room temperature to prepare a dispersion liquid. An aliquot of the dispersion was subjected to gas chromatography using an internal standard method, yielding the polymerization degree of more than 90%. In this way, Resin Fine Particles 1 was produced. Resin Fine Particles 1 had a weight average particle diameter (D4) of 6.9 μm and a number average particle diameter (Dn) of 6.1 μm, the (D4)/(Dn) being is 1.13 by means of the particle size distribution measurement using a COULTER MULTISIZER II (100 μm-aperture tube).

Next, 20 parts of ethanol and 30 parts of Solvent Black were heated and melted, and non-dissolved ingredients were removed by filtration through a 1 μm-pore diameter filter. Thereafter, 20 parts of the filtrated product, 100 parts of ethanol, and 100 parts of Resin Fine Particles 1 were loaded in a vessel, and stirred at 50° C. for 1 hour so as to color Resin Fine Particles 1. The obtained colored solution was cooled to room temperature, and subjected to centrifugal sedimentation, and the supernatant liquid was removed, and then the colored solution was dispersed in ethanol again. This process was repeated 3 times, and then the colored solution was filtrated to obtain Comparative Colored Polymer Particles 4 (yield 90%).

Comparative Example 5

-Preparation of Polymerizable Monomer Composition-

A polymerizable monomer consisting of 80 parts of styrene, 20 parts of n-butyl acrylate and 0.5 parts of divinylbenzene, 1 part of Surfactant 1, and 5 parts of synthesized ester wax (WEP05 manufactured by NOF CORPORATION) were uniformly dispersed by a batch type sand mill (manufactured by Kanpe Hapio Co., Ltd.) for 4 hours to prepare Polymerizable Monomer Composition 14.

<Supercritical Polymerization Step>

A pressure-resistant reaction cell was charged with 100 parts of Polymerizable Monomer Composition 14 (20 volume % of the pressure-resistant reaction cell). Carbon dioxide was selected as a supercritical fluid and the pressure-resistant reaction cell was supplied therewith using a supply cylinder. The cell pressure was controlled at 30 MPa using a pressure pump, and the cell temperature was controlled at 65° C. using a temperature controller. The cell was further charged with 1 part of 2,2'-azobisisobutyronitrile (AIBN, manufactured by Wako Pure Chemical Industries, Ltd.) as a polymerization initiator, allowing a reaction to take place for 48 hours. In the mixture, 1 part of C.I. Disperse Yellow 160 (manufactured by Nihon Kayaku Co., Ltd) was added and then colored for 1 hour.

After termination of the reaction, the pressure-resistant reaction cell was cooled to a temperature of 5° C. while keeping pressure, and then carbon dioxide was flowed for over 6 hours to remove monomers left over by adjusting a flow rate of an outlet side of a back pressure valve to 5.0 L/min using the pressure pump and the back pressure valve. Thereafter, the reaction cell was gradually brought to normal temperature and pressure to obtain Comparative Colored Polymer Particles 5. Comparative Colored Polymer Particles 5 had a weight average particle diameter (D4) of 35.7 μm (yield 98%) by means of the particle size distribution measurement using a COULTER MULTISIZER II (100 μm-aperture tube). As a result of observing the colored polymer particles, many cohered coarse particles had been found. Thus, the coarse particles were removed by classification to obtain Comparative Toner 5 (weight average particle diameter (D4) of 9.5 μm). The yield of Comparative Toner 5 was 5%.

To 100 parts of the thus obtained colored polymer particles, 0.7 parts of hydrophobic silica and 0.3 parts of hydrophobized titanium oxide were added and mixed using a HENSCHEL MIXER at a circumferential speed of 8 m/s for 5 minutes. The mixed powder was passed through 100 μm-aperture mesh to remove coarse particles thereby to obtain a toner. Five (5) % by mass of the toner treated with an external additive and 95% of a silicone resin-coated cupper-zinc ferrite carrier having an average particle diameter of 40 μm were uniformly mixed and charged by TURBULA MIXER in which a vessel is rolled for stirring so as to prepare each of two-component Developers 1 to 19, 39, 40, and 43 to 48. Note that the colored polymer particles used in two-component Developers 1 to 19, 39, 40, and 43 to 48 respectively corresponded to Colored Polymer Particles 1 to 27.

Moreover, to 100 parts of colored polymer particles, 0.7 parts of hydrophobic silica and 0.3 parts of hydrophobized titanium oxide were added and mixed using a HENSCHEL MIXER at a circumferential speed of 8 m/s for 5 minutes, thereby to obtain each of one-component Developers 20 to 38, 41, 42, and 49 to 54. Note that the colored polymer particles used in one-component Developers 20 to 38, 41, 42, and 49 to 54 respectively corresponded to Colored Polymer Particles 1 to 27.

To 100 parts of the thus obtained colored polymer particles, 0.7 parts of hydrophobic silica and 0.3 parts of hydrophobized titanium oxide were added using a HENSCHEL MIXER at a circumferential speed of 8 m/s for 5 minutes to obtain a comparative toner. Next, Five (5) % by mass of the comparative toner treated with an external additive and 95% of a silicone resin-coated cupper-zinc ferrite carrier having an average particle diameter of 40 μm were uniformly mixed and charged by a TURBULA MIXER in which a vessel is rolled for stirring so as to prepare each of two-component Comparative Developers 1 to 3 and 7. Note that the colored polymer particles used in two-component Comparative Developers 1 to 3 and 7 respectively corresponded to Colored Polymer Particles 1 to 4.

Moreover, to 100 parts of the comparative colored polymer particles, 0.7 parts of hydrophobic silica and 0.3 parts of hydrophobized titanium oxide were added and mixed using a HENSCHEL MIXER at a circumferential speed of 8 m/s for 5 minutes, thereby to obtain each of one-component Comparative Developers 4 to 6, and 8. Note that the colored polymer particles used in one-component Comparative Developers 4 to 6 and 8 respectively corresponded to Comparative Colored Polymer Particles 1 to 4.

Comparative Toner 5 had a low yield, therefore evaluation was not performed.

The obtained Developers 1 to 54 and Comparative Developers 1 to 8 were respectively loaded in an image forming apparatus, IPSIO COLOR 8100 (manufactured by Ricoh Company, Ltd.) used for evaluation of the two-component developer, and IMAGIO NEO C200 used for evaluation of the one-component developer, and then images were output and evaluated as described below. The results are shown in Tables 2A, 2B and 3.

<Image Density>

For each developer, a solid image was output on regular transfer paper (Type 6200, manufactured by Ricoh Company, Ltd.), with the low deposited amount of developer being 0.3±0.1 mg/$cm^2$, and then the image density was measured by X-Rite (manufactured by X-Rite).

Evaluation Criteria:

A: Image density of 1.4 or more

B: Image density of 1.35 or more to less than 1.4

C: Image density of 1.3 or more to less than 1.35

D: Image density of less than 1.3

<Cleaning Ability>

A residual toner on a photoconductor just after cleaned was transferred onto white paper with a SCOTCH TAPE (manufactured by Sumitomo 3M Ltd.) after 1,000 sheets of a chart having an image area of 95% were output. The density of the white paper was measured by Macbeth reflection densitometer RD514, and evaluated on the following evaluation criteria.

Evaluation Criteria:

A: Difference with blank was less than 0.005.

B: Difference with blank was from 0.005 or more to less than 0.010.

C: Difference with blank was from 0.010 or more to less than 0.02.

D: Difference with blank was 0.02 or more.

<Transferability>

A residual toner on a photoconductor just before cleaning was transferred onto white paper with a SCOTCH TAPE (manufactured by Sumitomo 3M Ltd.) after a chart having an image area of 20% was transferred from the photoconductor to paper. The density of the white paper was measured by MACBETH REFLECTION DENSITOMETER RD514, and evaluated on the following evaluation criteria.

Evaluation Criteria:

A: Difference with blank was less than 0.005.

B: Difference with blank was from 0.005 or more to less than 0.010.

C: Difference with blank was from 0.010 or more to less than 0.02.

D: Difference with blank was 0.02 or more.

<Toner Scattering>

After 100,000 sheets of a chart having an image area of 5% were continuously output using each of toners in an image forming apparatus (IPSIO COLOR8100, manufactured by Ricoh Company, Ltd.), which had been altered to oilless fixing system and tuned for evaluation, under the conditions of temperature of 40° C. and 90% RH, the level of toner contamination in the image forming apparatus was visually observed and evaluated on the following criteria.

Evaluation Criteria:

A: No toner contamination was observed at all in the image forming apparatus, and an excellent state was maintained.

B: Slight toner contamination was observed in the image forming apparatus, and a satisfactory state was maintained.

C: Toner contamination was observed in the image forming apparatus, however, it was still on the practical level.

D: Toner contamination was severe in the image forming apparatus, and it was far from the practical level.

<Charge Stability>

When the endurance test of 100,000 sheets continuous output was performed using each of toners and a character and image pattern having an image area of 12%, and change of charge amount was evaluated. A small amount of the developer was taken from a sleeve, and the change of the charge amount was found by the blowoff method and evaluated on the following evaluation criteria.

Evaluation Criteria:

A: Change of the charge amount was less than 5 μc/g.

B: Change of the charge amount was 5 μc/g to 10 μc/g.

C: Change of the charge amount was more than 10 μc/g.

<Filming>

After 1,000 sheets of a band chart having image areas of 100%, 75% and 50% were output, the filming over a developing roller and photoconductor were visually observed and evaluated on the following evaluation criteria.

Evaluation Criteria:

A: No filming occurred.

B: Filming slightly occurred.

C: Streaky filming occurred.

D: Filming occurred all over the developing roller and photoconductor.

TABLE 2A

| | Image density | Toner scattering | Transfer-ability | Charge stability | Filming | Cleaning ability | Total evaluation |
|---|---|---|---|---|---|---|---|
| Developer 1 | A | A | A | B | A | B | A |
| Developer 2 | A | B | B | B | B | B | B |
| Developer 3 | A | A | A | B | B | B | A |
| Developer 4 | B | A | C | B | A | B | B |
| Developer 5 | A | B | B | B | B | B | B |
| Developer 6 | B | A | B | B | B | B | B |
| Developer 7 | B | B | B | B | A | B | B |
| Developer 8 | B | B | B | B | A | B | B |
| Developer 9 | B | A | C | B | B | C | B |
| Developer 10 | A | B | B | B | A | B | A |
| Developer 11 | A | A | B | B | A | B | A |
| Developer 12 | A | B | B | B | B | B | B |
| Developer 13 | B | A | C | B | B | B | B |
| Developer 14 | B | A | B | B | B | B | B |
| Developer 15 | B | A | B | B | B | B | B |
| Developer 16 | A | B | B | B | A | B | A |
| Developer 17 | A | B | B | B | A | B | A |
| Developer 18 | A | B | B | B | B | C | B |
| Developer 19 | A | B | B | B | B | B | B |
| Developer 20 | A | B | B | B | A | B | A |
| Developer 21 | A | B | B | B | B | B | B |
| Developer 22 | A | B | B | B | B | B | B |
| Developer 23 | B | A | C | B | A | B | B |
| Developer 24 | A | B | B | B | B | B | B |

TABLE 2B

| | Image density | Toner scattering | Transfer-ability | Charge stability | Filming | Cleaning ability | Total evaluation |
|---|---|---|---|---|---|---|---|
| Developer 25 | B | B | B | B | B | B | B |
| Developer 26 | B | B | B | B | B | B | B |
| Developer 27 | B | B | B | B | B | B | B |
| Developer 28 | B | A | C | B | B | B | B |
| Developer 29 | A | B | B | B | B | B | B |
| Developer 30 | A | B | B | B | A | B | A |
| Developer 31 | A | B | B | B | A | B | A |
| Developer 32 | B | A | C | B | A | B | B |
| Developer 33 | B | A | B | B | B | B | B |
| Developer 34 | B | A | B | B | B | B | B |
| Developer 35 | A | B | B | B | A | B | A |
| Developer 36 | A | B | B | B | A | B | A |
| Developer 37 | A | B | B | B | B | B | B |
| Developer 38 | A | B | B | B | B | B | B |
| Developer 39 | A | A | A | A | A | B | A |
| Developer 40 | A | A | B | A | B | B | A |
| Developer 41 | A | A | A | A | A | B | A |
| Developer 42 | A | A | B | A | B | B | A |
| Comparative Developer 1 | C | D | C | C | C | D | C |
| Comparative Developer 2 | C | D | C | D | D | C | D |
| Comparative Developer 3 | D | C | D | C | D | C | D |
| Comparative Developer 4 | C | C | D | C | C | D | C |
| Comparative Developer 5 | D | D | C | D | C | D | D |
| Comparative Developer 6 | D | D | D | D | D | C | D |

From the results of Tables 2A and 2B, it had been confirmed that Developers 1 to 42 using the toners obtained from polymerization according to the present invention were superior in the toner scattering, transferability, charge stability, filming and cleaning ability, to Comparative Developers 1 to 6, and contributed to obtaining high density image.

Moreover, according to the method for producing the toner of the present invention, a dried toner could be obtained from polymerization only by adjusting the pressure back to normal without a dry step and with no waste liquid generated, thus the present invention provides an innovative method for producing a toner in terms of low cost, low environmental load, energy saving, and resource saving.

TABLE 3

| | Image density | Cleaning ability | Transfer-ability | Toner scattering | Charge stability | Filming |
|---|---|---|---|---|---|---|
| Developer 43 | A | B | A | A | B | A |
| Developer 44 | A | A | A | A | B | A |
| Developer 45 | A | A | B | A | B | B |
| Developer 46 | A | A | A | B | B | B |
| Developer 47 | A | B | A | A | B | A |
| Developer 48 | A | B | B | A | B | A |
| Developer 49 | A | B | B | A | B | A |
| Developer 50 | A | B | B | A | B | A |
| Developer 51 | A | A | A | A | B | A |
| Developer 52 | A | A | A | B | B | B |
| Developer 53 | A | A | A | A | B | B |
| Developer 54 | A | A | A | B | B | B |
| Comparative Developer 7 | D | C | D | D | C | C |
| Comparative Developer 8 | D | C | D | D | D | C |

From the results of Table 3, it had been confirmed that the Developers 43 to 50 using the toners obtained from polymerization according to the present invention were superior in the charge stability, cleaning ability, transferability, toner scattering and filming to Comparative Developers 7 to 8, and contributed to obtaining high density image. Particularly, Comparative Developers had low image density due to low coloring ability using the dye. It was also found that the toner of the present invention could provide sufficient coloring and image density, because the dye permeated inside resin fine particles.

Moreover, according to the method for producing the toner of the present invention, a dried toner could be obtained from polymerization only by adjusting the pressure back to normal without a dry step and with no waste liquid generated, thus the present invention provides an innovative method for producing a toner in terms of low cost, low environmental load, energy saving, and resource saving.

The particle diameter and weight average molecular weight of the colored polymer particles and the weight average molecular weight of the surfactants were measured as follows:

<Measurement of Particle Diameter>

As measurement apparatuses of particle size distribution of toner particles by the Coulter Counter method, for example, Coulter Counter TA-II and COULTER MULTISIZER II (both are manufactured by Coulter) are used. A measurement method will be described below.

First, as a dispersant, 0.1 ml to 5 ml of a surfactant (preferably, polyoxyethylene alkyl ether: product name, DRYWELL) was added to 100 ml to 150 ml of an electrolytic aqueous solution. Note that the electrolytic solution was an approximately 1% NaCl aqueous solution prepared using primary sodium chloride, for example, ISOTON-II (by Beckmann Coulter Inc.). Subsequently, 2 mg to 20 mg of sample to be measured was further added. The sample suspension was sonicated for approximately 1 minute to 3 minutes using an ultrasonic dispersion device. By the measurement instrument using 100 μm-aperture, the weight and the number of toner particles were measured to produce its weight distribution and number distribution, from which the weight average particle diameter (D4) and number average particle diameter (Dn) were obtained. The results are shown in Tables 2A and 2B.

For channels, 13 different channels were used—from 2.00 μm or more to less than 2.52 μm; from 2.52 μm or more to less than 3.17 μm; from 3.17 μm or more to less than 4.00 μm; from 4.00 μm or more to less than 5.04 μm; from 5.04 μm or more to less than 6.35 μm; from 6.35 μm or more to less than 8.00 μm; from 8.00 μm or more to less than 10.08 μm; from 10.08 μm or more to less than 12.70 μm; from 12.70 μm or more to less than 16.00 μm; from 16.00 μm or more to less than 20.20 μm; from 20.20 μm or more to less than 25.40 μm; from 25.40 μm or more to less than 32.00 μm; and from 32.00 μm or more to less than 40.30 μm-targeting particles having a diameter of from 2.00 μm or more to less than 40.30 μm.

Molecular Weight Measurement of Colored Particles by GPC

The number average molecular weight (Mn) of the colored particles was measured by Gel Permeation Chromatography (GPC) under the following conditions:

Instrument: GPC-150C (manufactured by Waters Corporation)

Columns: KF801-807 (manufactured by Shodex)

Temperature: 40° C.

Solvent: tetrahydrofuran (THF)

Flow rate: 1.0 ml/min

Samples: 0.1 ml of samples having concentrations of 0.05% to 0.6%

From a molecular weight distribution of the sample obtained under the above conditions, a molecular weight calibration curve was constructed according to monodisperse polystyrene standards. By using the molecular weight calibration curve, the number average molecular weight (Mn) and weight average molecular weight (Mw) of the resin particles were calculated.

Molecular Weight Measurement of Surfactant by GPC

Instrument: HLC-8220GPC (manufactured by TOSOH Corporation)

Columns: 3 columns of TSKgel GMHHR-M (internal diameter: 4.6 mm×length: 15 cm)

Guard column: TSKguardcolumn HHRH(S)

Solvent: hexafluoroisopropanol (HFIP) containing 5 mM sodium trifluoroacetate solution Flow rate: 0.2 ml/min Injection amount: 10 μl Column temperature: 40° C.

Sample concentration: 0.15 mass %

Detecting Element: UV (254 nm), RI

The number average molecular weight (Mn), and weight average molecular weight (Mw) were calculated by optimizing calibration curve by a cubic curve using a standard PMMA (polymethyl methacrylate).

What is claimed is:

1. A method for producing colored polymer particles, comprising:

adding a colorant-containing composition comprising a radically polymerizable monomer and a colorant in a supercritical fluid or a subcritical fluid and polymerizing the radically polymerizable monomer, so as to produce colored polymer particles which are insoluble in the supercritical fluid or subcritical fluid, wherein the supercritical fluid or subcritical fluid is a supercritical fluid or subcritical fluid in which at least the radically polymerizable monomer is soluble, but polymer particles resulted from polymerization of the radically polymerizable monomer are insoluble, and wherein the supercritical fluid or subcritical fluid further comprises a releasing agent, and the colored polymer particles contain the releasing agent, wherein the releasing agent is dispersed in the radically polymerizable monomer so as to form a dispersion liquid of the releasing agent, and the dispersion liquid of the releasing agent is added in the composition, and wherein the colorant is at least one selected from the group consisting of a pigment, a dye and a polymer dye.

2. The method for producing colored polymer particles according to claim 1, wherein the supercritical fluid or subcritical fluid further comprises a surfactant which affects both the radically polymerizable monomer and the supercritical fluid or subcritical fluid.

3. The method for producing colored polymer particles according to claim 1, wherein the colorant is the dye or the polymer dye, and the dye or the polymer dye is dissolved in the radically polymerizable monomer.

4. The method for producing colored polymer particles according to claim 1, wherein the supercritical fluid or subcritical fluid is supercritical carbon dioxide or subcritical carbon dioxide.

5. The method for producing colored polymer particles according to claim 1, wherein the polymerization is dispersion polymerization.

6. The method for producing colored polymer particles according to claim 2, wherein the surfactant has a partial structure expressed by General Formula (1)

General Formula (1)

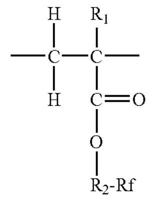

where $R_1$ represents a hydrogen atom or methyl group, $R_2$ represents a methylene group or ethylene group, and Rf represents a perfluoroalkyl group having carbon atoms of 7 to 10.

* * * * *